(12) United States Patent
Sasaki et al.

(10) Patent No.: US 8,914,364 B2
(45) Date of Patent: Dec. 16, 2014

(54) CONTENT NOTIFYING DEVICE, NOTIFYING METHOD, AND PROGRAM

(75) Inventors: Jun Sasaki, Osaka (JP); Ryuhsuke Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 354 days.

(21) Appl. No.: 13/389,213

(22) PCT Filed: Jul. 21, 2010

(86) PCT No.: PCT/JP2010/062202
§ 371 (c)(1),
(2), (4) Date: Feb. 6, 2012

(87) PCT Pub. No.: WO2011/016335
PCT Pub. Date: Feb. 10, 2011

(65) Prior Publication Data
US 2012/0136867 A1    May 31, 2012

(30) Foreign Application Priority Data

Aug. 7, 2009 (JP) ................................ 2009-184481

(51) Int. Cl.
*G06F 17/30* (2006.01)
*G06F 3/00* (2006.01)
(Continued)

(52) U.S. Cl.
CPC .......... *G06F 17/30873* (2013.01); *H04N 5/445* (2013.01); *H04N 5/782* (2013.01); *H04N 21/4334* (2013.01); *H04N 21/47214* (2013.01); *H04N 21/4828* (2013.01); *H04N 21/4882* (2013.01); *H04N 2005/44547* (2013.01)
USPC ........... 707/736; 707/721; 707/731; 707/770; 707/805; 725/39; 725/53

(58) Field of Classification Search
CPC .......... H04N 21/4532; H04N 5/44543; H04N 2005/44547; H04N 21/42204; H04N 21/482; H04N 21/4828; H04N 21/8405; G06F 17/30843; G06F 17/30846; Y10S 707/99933; Y10S 707/99943
USPC ......... 707/722, 723, 736, 721, 731, 770, 805, 707/806; 715/200, 201, 204, 205, 207, 212, 715/234, 730, 736, 770, 810, 812, 813, 819, 715/820, 825; 725/37, 39, 43, 46, 53
See application file for complete search history.

(56) References Cited

U.S. PATENT DOCUMENTS 7,506,350 B2 * 3/2009 Johnson ........................... 725/53
8,572,649 B1 * 10/2013 Gossweiler et al. ............. 725/39
(Continued)

FOREIGN PATENT DOCUMENTS

CN          1801908 A      7/2006
JP       2000-099234 A     4/2000
(Continued)

OTHER PUBLICATIONS

International Search Report, PCT//JP2010/062202, Sep. 28, 2010.

*Primary Examiner* — Cheryl Lewis
(74) *Attorney, Agent, or Firm* — Birch, Stewart, Kolasch & Birch, LLP

(57) ABSTRACT

A program search device is configured to extract a program using search condition attribute information of the program. The device includes a unit storing information concerning the storage condition, and a display control to control display of a list that includes both search condition information and a program list. The display control highlights a search condition as most recently stored in the storing unit.

19 Claims, 26 Drawing Sheets

(51) Int. Cl.
*G06F 13/00* (2006.01)
*H04N 5/445* (2011.01)
*H04N 5/782* (2006.01)
*H04N 21/433* (2011.01)
*H04N 21/472* (2011.01)
*H04N 21/482* (2011.01)
*H04N 21/488* (2011.01)

(56) References Cited

U.S. PATENT DOCUMENTS

| | | | |
|---|---|---|---|
| 2003/0154482 A1 | 8/2003 | Tsukamoto et al. | |
| 2004/0073926 A1 | 4/2004 | Nakamura et al. | |
| 2004/0148629 A1 | 7/2004 | Shibamiya et al. | |
| 2006/0179419 A1 | 8/2006 | Narahara et al. | |
| 2010/0094896 A1 | 4/2010 | Ozawa et al. | |
| 2011/0288912 A1* | 11/2011 | McCrea et al. | 705/14.2 |

FOREIGN PATENT DOCUMENTS

| | | |
|---|---|---|
| JP | 2002-32294 A | 1/2002 |
| JP | 2003-219300 A | 7/2003 |
| JP | 2004-135169 A | 4/2004 |
| JP | 2006-191486 A | 7/2006 |
| JP | 2006-309364 A | 11/2006 |
| JP | 2007-181244 A | 7/2007 |

* cited by examiner

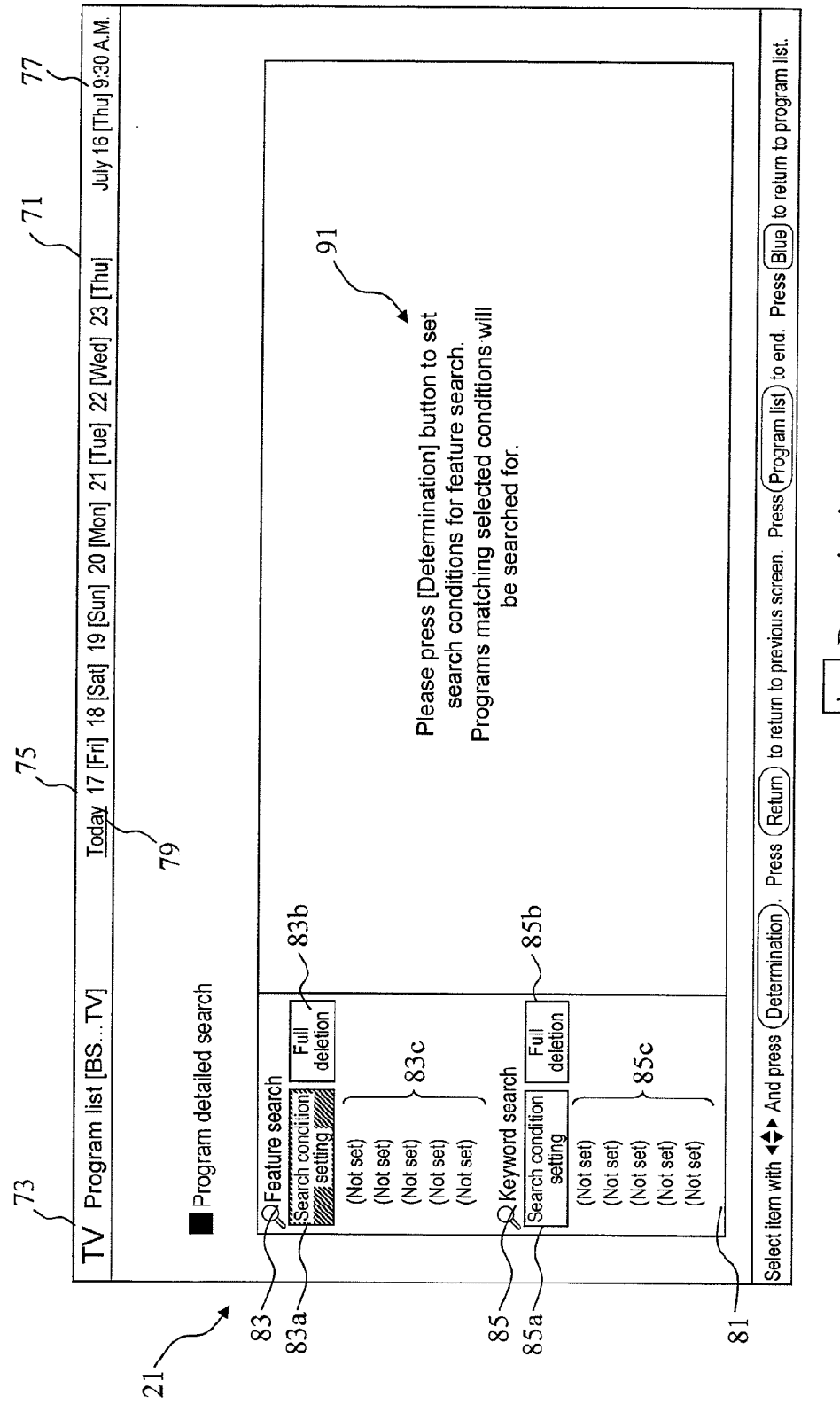

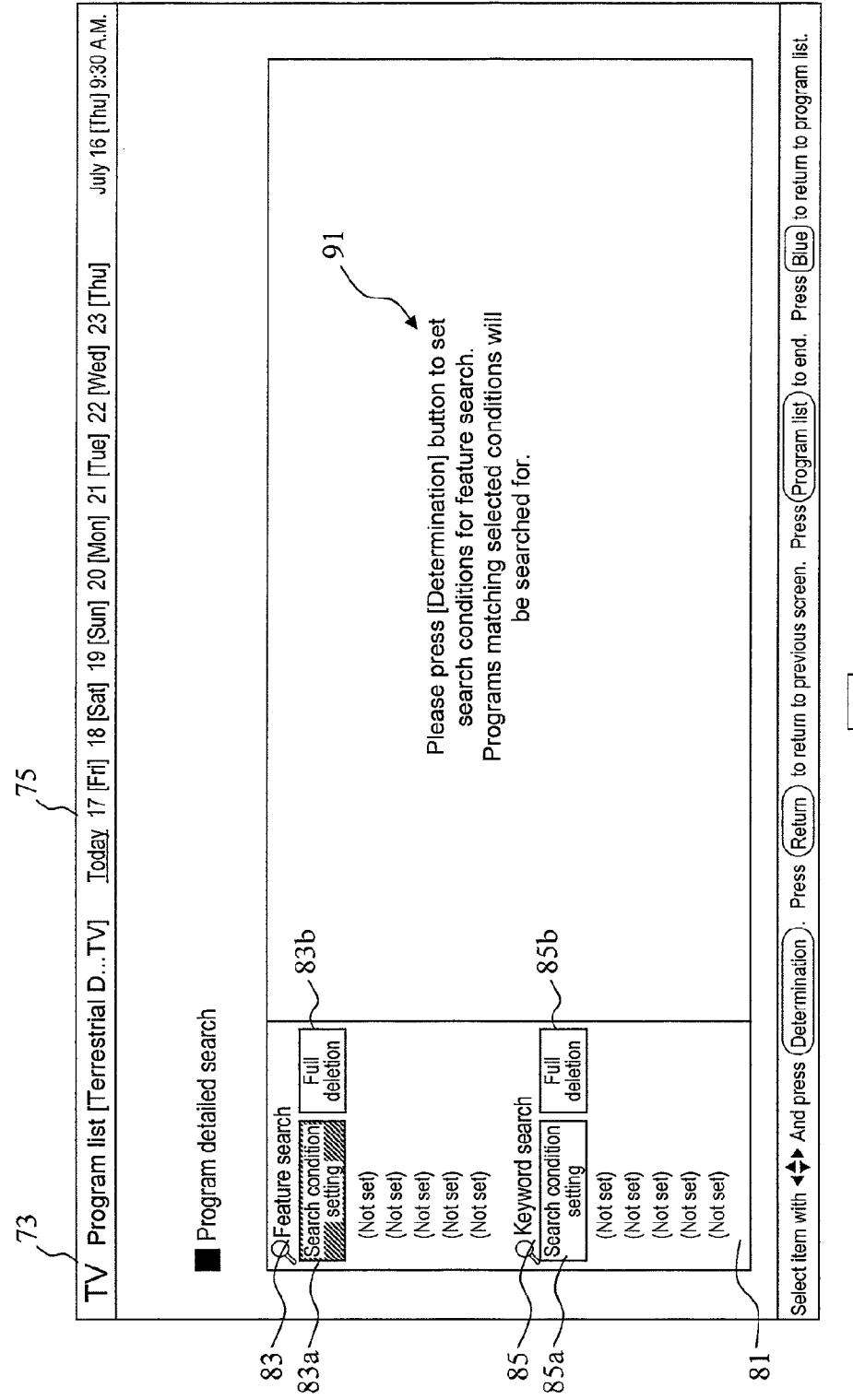

CONTENT NOTIFYING DEVICE, NOTIFYING METHOD, AND PROGRAM

TECHNICAL FIELD

The present invention relates to a content notification technique, and more specifically to a technique for searching for and notifying contents.

BACKGROUND ART

Along with growth of multichannel broadcasting in recent years, users have been more likely to miss contents such as broadcast programs that they wanted to watch. To address such a situation, there is known a technique for allowing a content reproduction device such as a television receiver device to notify a user of contents. For example, in a technique disclosed in Patent Document 1 cited below, keywords designated by a user are assigned colors specified for the respective inputted keywords using another screen, and the keywords are displayed in the specified colors on an electronic program guide (EPG). When a program displayed in a color is selected with a cursor on the EPG, the keyword shown in a program information column outside the EPG frame is also displayed in the same color. This allows a user to more easily know a program that the user wishes to watch.

PRIOR ART DOCUMENT

Patent Document

Patent Document 1: Japanese Patent Application Publication No. 2003-219300

SUMMARY OF THE INVENTION

Problem to be Solved by the Invention

However, according to the method disclosed in Patent Document 1 cited above, the keyword and the program column are displayed in different positions and therefore are difficult to see particularly on a large-screen digital television receiver device and the like due to the necessity of movement of a line of sight. In particular, a complicated operation is required in the case of continuously carrying out the next search after viewing of a program search result.

An object of the present invention is to simplify a continuous search operation for searching contents such as programs and to make a search result easier to understand.

Means for Solving the Problem

The present invention is characterized by switching display between a screen for inputting a search condition such as a category or a keyword and a screen for displaying a program list. In this way, the invention has an advantage of enabling the display for search condition settings and the display for program selection including a search result to be provided in a large scale and thereby to be easily handled. Moreover, when a result is displayed immediately after a user makes a search by inputting a condition for searching for a program, such as a keyword or any program information, a highlighted position is automatically set on the just-searched item. This makes it easier to perform a movement for a condition input for the next search item and to perform a highlight movement for displaying a search result.

According to an aspect of the present invention, there is provided a program search device configured to extract a program by using a search condition matching attribute information of the program, comprising: a search condition storage unit configured to store the search condition; and a display control unit configured to perform control to cause a display unit to perform list display including both a search condition list and a program list representing a search result, wherein the display control unit sets a search condition most recently stored in the search condition storage unit as a highlighted position on the search condition list. It is preferable to display the program extracted by the search condition in the highlighted position on the program list.

Preferably, the search condition is a characteristic category of a program and the characteristic category to be included in the search condition list is selected on a screen different from the screen of the list display and is stored in the search condition storage unit. It is also possible to provide a feature search condition list display unit configured to select characteristic categories to be included in the search condition list. Preferably, the feature search display unit is provided with buttons configured to arrange the characteristic categories in a matrix fashion, and is configured to perform display while highlighting an immediately precedent selection and attaching an identifiable indicator to an earlier selection. Preferably, the search condition is a keyword to be inputted, and a keyword item to be included in the search condition list is selected by inputting the keyword either on the screen for displaying the list or on the different screen so as to be stored in the search condition storage unit. It is desirable to provide an individual deletion button configured to delete a targeted keyword in a selected state in order to selectively and individually delete a search condition list of the keyword. It is also possible to provide the screen that displays the keyword search condition list with a full deletion button configured to fully delete all the keywords on the keyword search condition list.

It is desirable to display the characteristic category search condition list and the inputted keyword search condition list described above on the same screen so as to allow a change in the search condition in a cross-cutting manner by moving a cursor between the characteristic category search condition list and the inputted keyword search condition list.

According to another aspect of the present invention, there is provided a program searching method for extracting a program by using a search condition matching attribute information of the program, comprising: a search condition storing step of storing the search condition; and a display controlling step of performing control to cause a display unit to perform list display including both a search condition list and a program list representing a search result, wherein in the display controlling step, a search condition most recently stored in the search condition storing step is set as a highlighted position on the search condition list. Preferably, the search condition is a characteristic category of a program and the method includes a step of selecting the characteristic category to be included in the search condition list on a screen different from the screen for displaying the list and storing the characteristic category in the search condition storage unit. Or preferably, the search condition is a keyword to be inputted and the method includes a step of selecting a keyword item to be included in the search condition list by inputting the keyword either on the screen for displaying the list or on the different screen and storing the keyword item in the search condition storage unit.

The present invention may be in the form of a program for causing a computer to execute the above-described program searching method or may be in the form of a computer-readable recording medium which records the program. The program may also be acquired by a transmission medium such as the Internet.

This description includes the contents disclosed in the description and/or the drawings of Japanese Patent Application No. 2009-184481 which forms the basis of priority of this application.

Effects of the Invention

According to the present invention, there is an advantage of enabling checking display of a result of a program search and providing a simple operation for proceeding to the next search.

BRIEF DESCRIPTION OF THE DRAWINGS

FIG. 3A is a view showing an aspect of screen switching based on a content search and notification technique according to a first embodiment of the present invention, which is the view showing the aspect of screen switching in the case of performing a feature search (a category search).

FIG. 7A is a view showing an example of screen switching based on a search technique by a keyword search according to a second embodiment of the present invention.

EXPLANATION OF THE REFERENCE NUMERALS

1 . . . front end, 3 . . . demultiplexer, 5 . . . video audio decoding unit, 7 . . . audio output unit, 11 . . . program information decoding unit, 15 . . . program list data generating unit 15, 17 . . . screen combining unit, 21 . . . display unit, 23 . . . remote control light receiving unit, 25 . . . control unit (CPU), 25a . . . display control unit, 25b . . . program search unit (characteristic (category), keyword), 27 . . . memory unit, 27a . . . feature search condition storage unit, 27b . . . inputted keyword storage unit, 53 . . . search condition determination unit, 61 . . . operating button (a search keyword input unit), 67 . . . search button (may be a color key instead), 83 . . . feature search condition list display unit, 83a . . . feature search setting button, 83b . . . feature search condition list, 85 . . . keyword search condition list display unit, 85a . . . keyword setting button, 85b . . . keyword search condition list full deletion button, 91 . . . search result display region, 101 . . . feature search condition selection panel, 103 . . .

feature search condition button, 107 . . . time slot selection button, 107a . . . today button, 111, 165 . . . search result program lists.

MODES FOR CARRYING OUT THE INVENTION

In this description, a "content" is a product such as a video image, an audio sound or a game created as a human cultural creative activity, which can be provided to a user by using broadcast, communication or through a recording medium. In the meantime, the user is an actor who watches the content by using a display device such as a television set, records the content on a storage device such as a recorder, or reproduces the content by using a reproduction device. The user can watch and record the content by operating a remote control device, for example.

A content notifying device according to an embodiment of the present invention will be described below based on a digital television receiver device as an example. Meanwhile, a user is an actor who watches the content by using a display device such as a television set, records the content on a storage device such as a recorder, or reproduces the content by using a reproduction device. The user can watch and record the content by operating a remote control device, for example.

Figure 1:
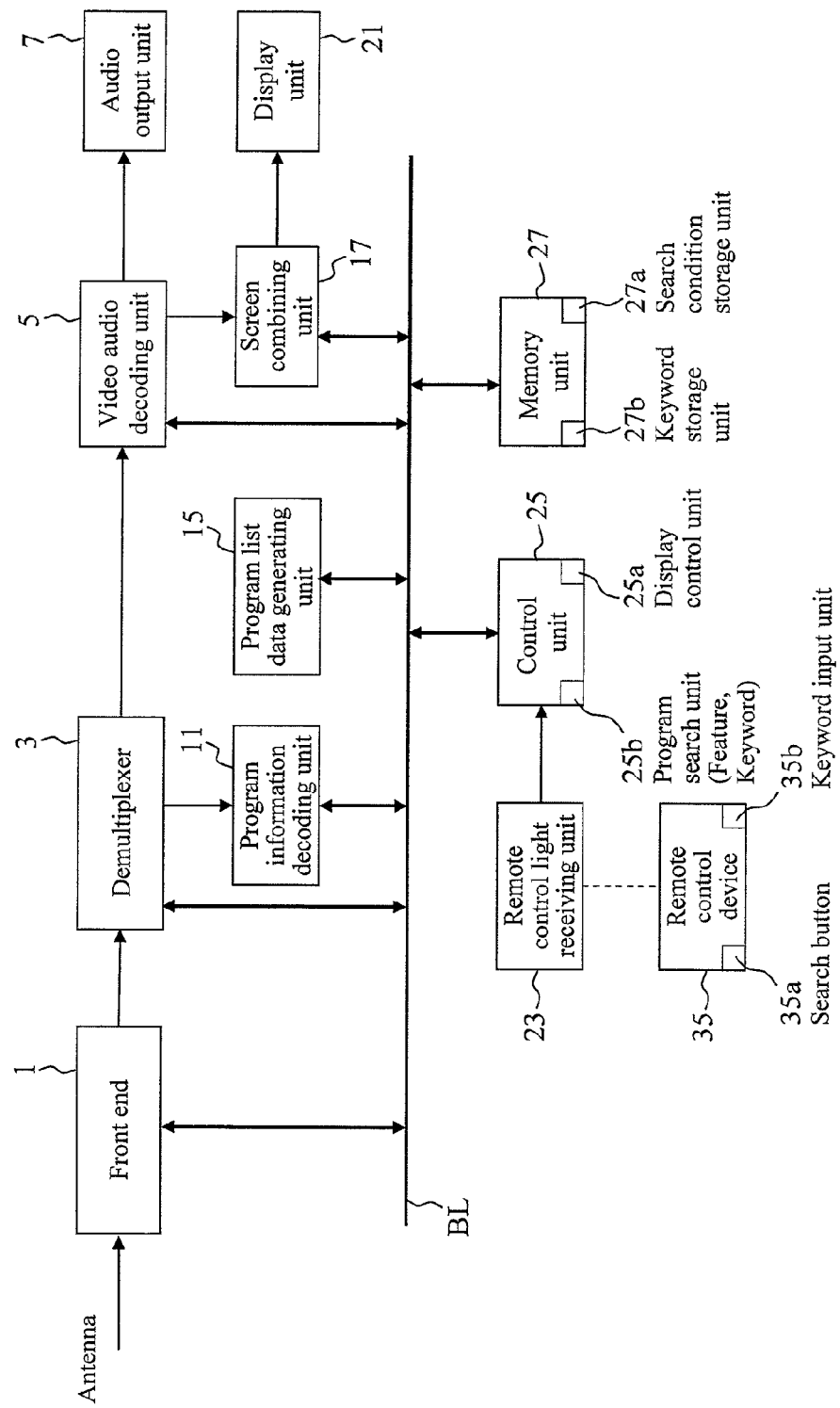
FIG. 1 is a functional block diagram showing a configuration example of a television receiver device according to an embodiment of the present invention.

A content notifying device according to an embodiment of the present invention will be described below based on a digital broadcast receiver device as an example. FIG. 1 is a functional block diagram showing a configuration example of the digital broadcast receiver device according to this embodiment. As shown in FIG. 1, the digital broadcast receiver device is provided with a front end 1 including a tuner or the like configured to select a broadcast content (a program) from a signal received by an antenna, a demultiplexer 3 configured to divide a multiplexed signal into a video signal and an audio signal, a video audio decoding unit 5 configured to decode the video signal and the audio signal which are encoded, an audio output unit 7 configured to output the decoded audio sound, a program information decoding unit 11 configured to decode program information using the output from the demultiplexer 3, a program list data generating unit 15 configured to generate electronic program guide (EPG) data using the program information, a screen combining unit 17 configured to combine a video image and program display data or the like, and a display unit 21 configured to display a video image combined by the screen combining unit 17.

Moreover, the digital broadcast receiver device includes a control unit (a CPU) 25 configured to control the function units as a whole, a memory unit 27 configured to store a program and the like for causing the CPU to execute a variety of processing, and a remote control light receiving unit 23 configured to receive a remote control signal from a remote control device 35.

Further, as for a display system, the control unit 25 in the digital broadcast receiver device of this embodiment includes a display control unit 25a configured to control display on the display unit 21 and a program search unit 25b configured to perform program search processing. Meanwhile, the memory unit 27 includes a search condition storage unit 27a configured to store a search condition and a keyword storage unit 27b configured to store an inputted keyword and the like.

Figure 2:
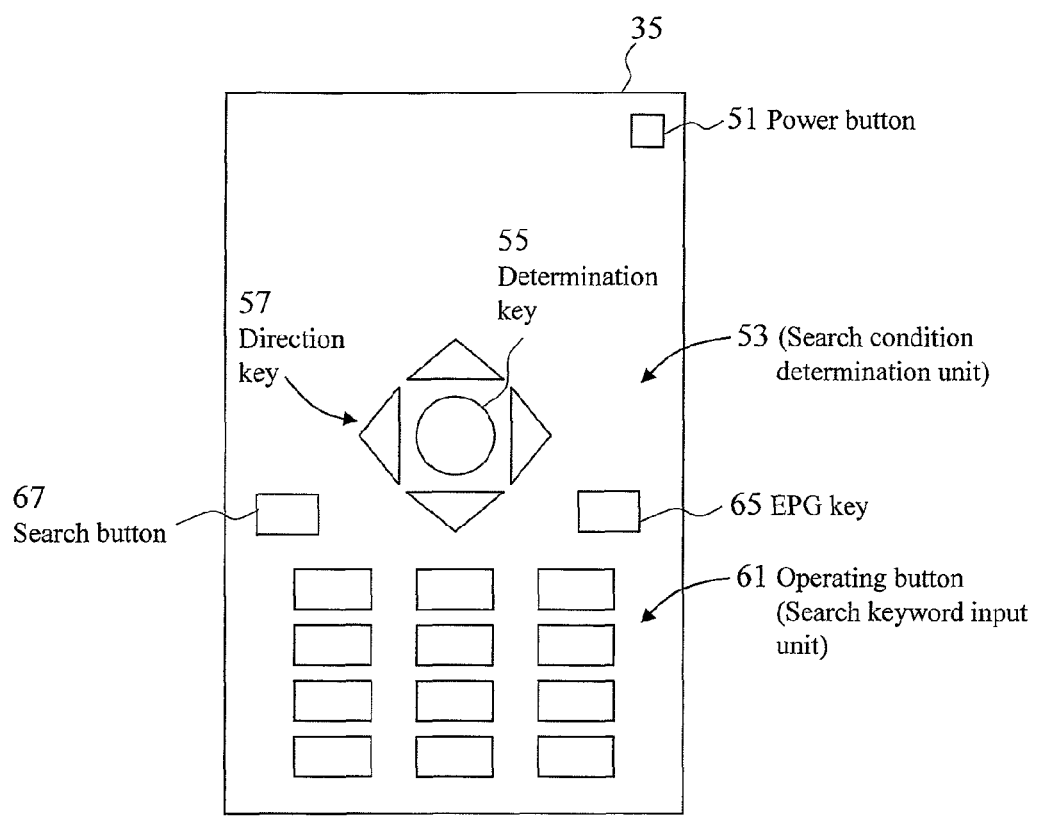
FIG. 2 is a view showing a configuration example of a top face of a remote control device according to the embodiment of the present invention.

FIG. 2 is a view showing a configuration of a top face of the remote control device 35. The remote control device 35 shown in FIG. 2 is provided with a power button 51, a key operating unit (a search condition determination unit) 53 including a determination key 55 and direction keys 57, an operating button (a search keyword input unit 35b) 61, and a search button (which may be allocated to a color key) 67.

Figure 3B:
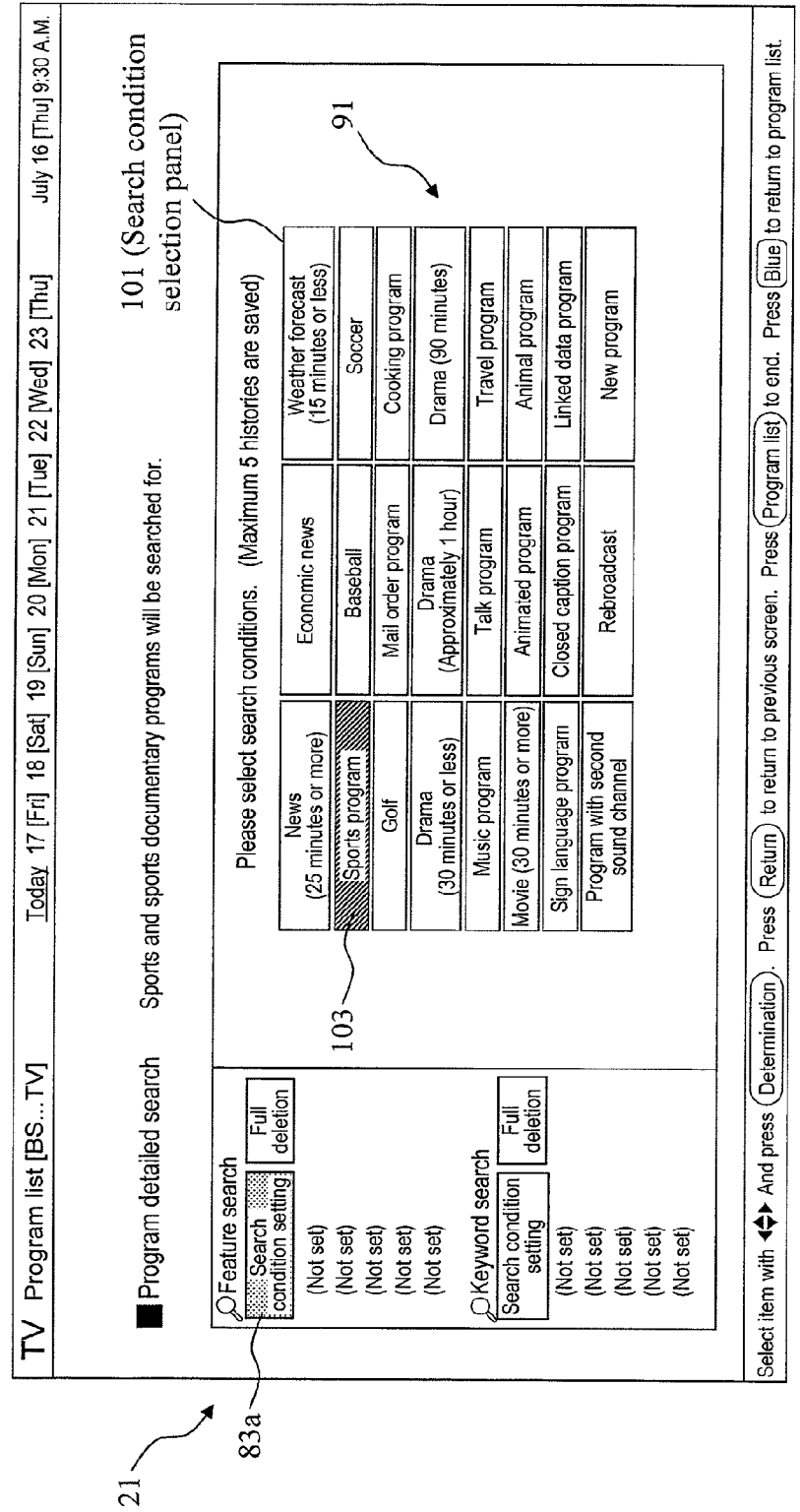
FIG. 3B is a view showing an aspect of screen switching based on a content search and notification technique according to the first embodiment of the present invention, which is the view showing the aspect of screen switching in the case of performing a feature search (a category search).
Figure 3C:
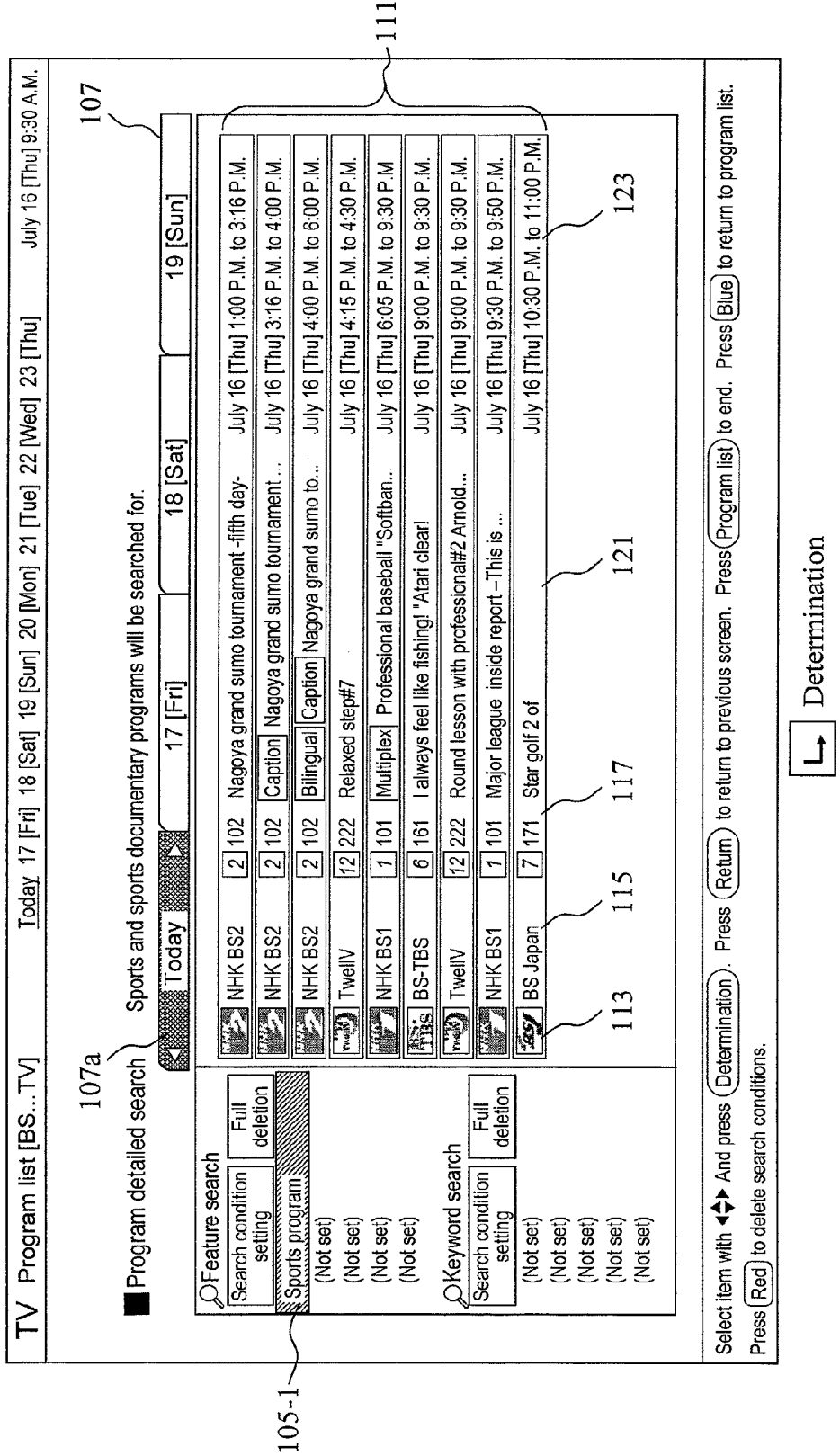
FIG. 3C is a view showing an aspect of screen switching based on a content search and notification technique according to the first embodiment of the present invention, which is the view showing the aspect of screen switching in the case of performing a feature search (a category search).
Figure 4A:
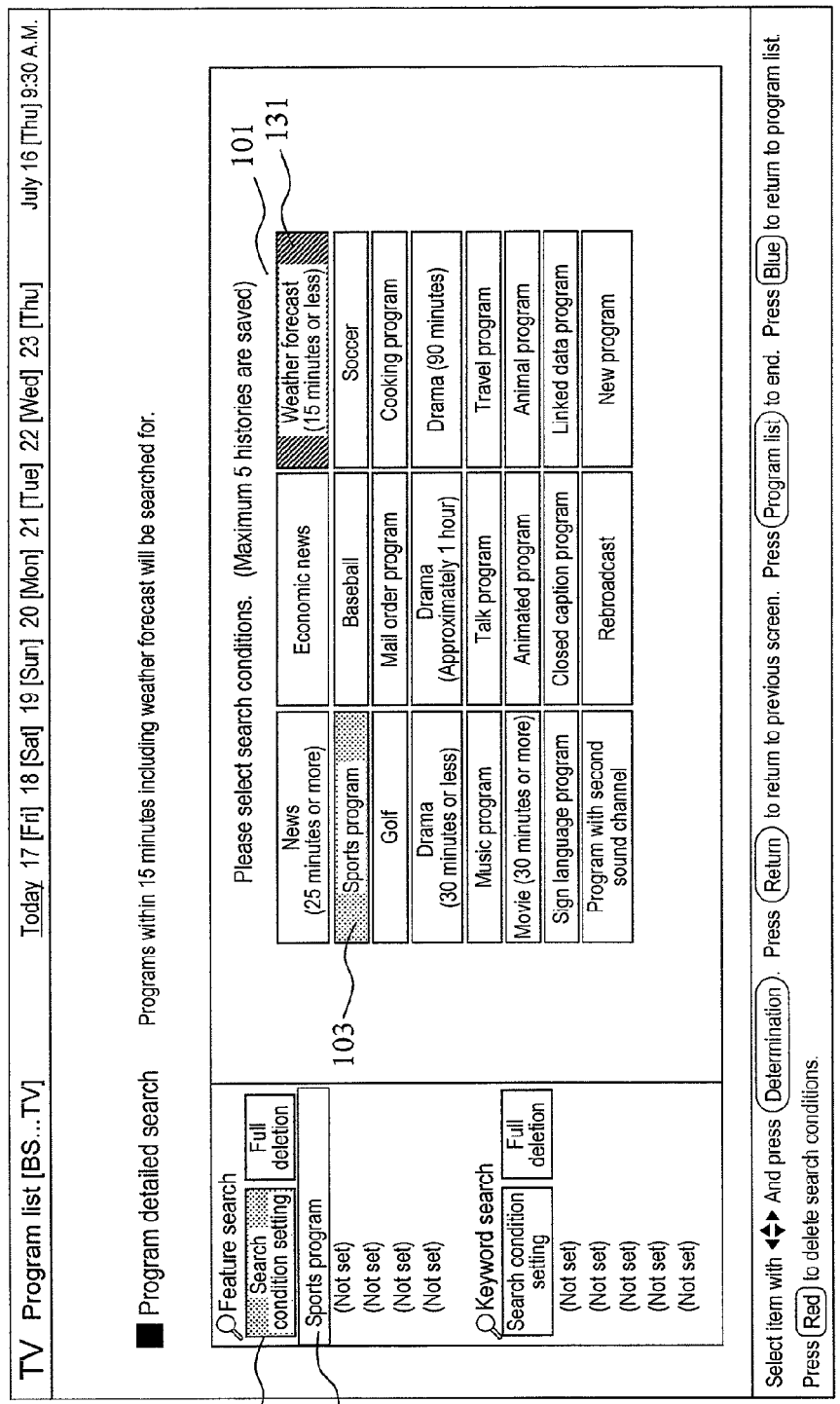
FIG. 4A is a view showing an aspect of screen switching based on a content search and notification technique according to the first embodiment of the present invention, which is the view showing the aspect of screen switching in the case of performing a feature search (a category search).
Figure 4B:
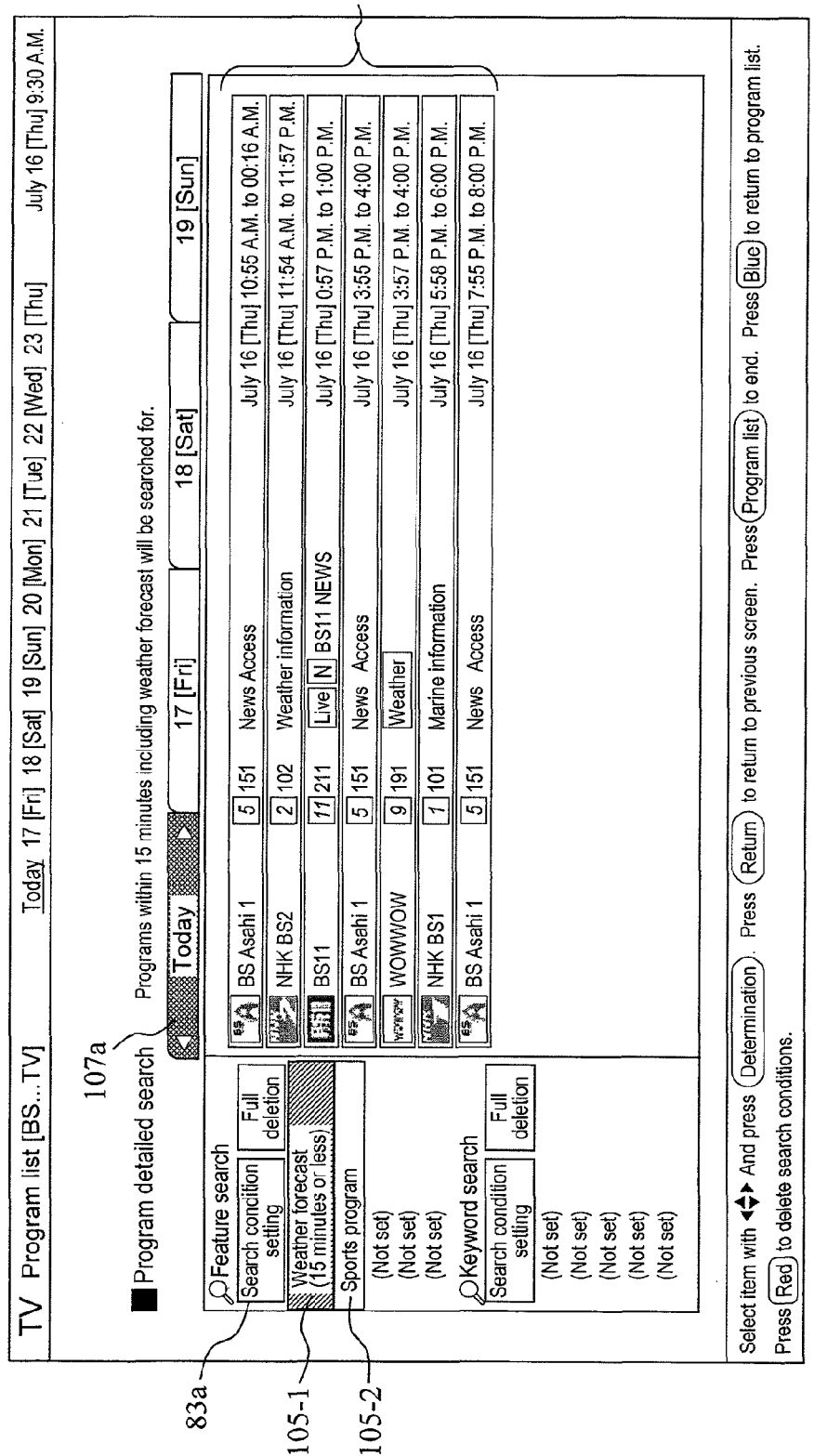
FIG. 4B is a view showing an aspect of screen switching based on a content search and notification technique according to the first embodiment of the present invention, which is the view showing the aspect of screen switching in the case of performing a feature search (a category search).
Figure 5A:
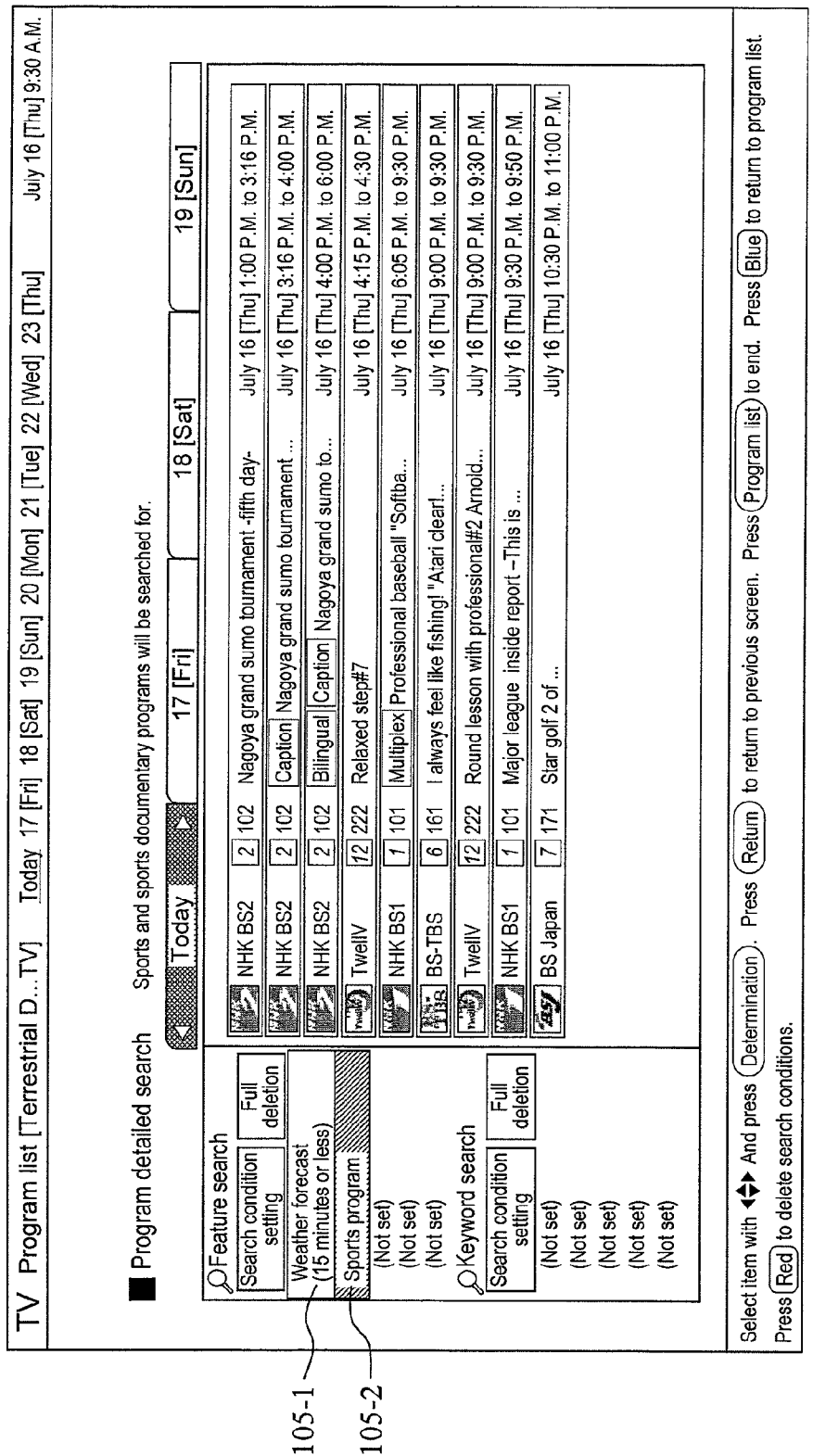
FIG. 5A is a view showing an aspect of screen switching based on a content search and notification technique according to the first embodiment of the present invention, which is the view showing the aspect of screen switching in the case of performing a feature search (a category search).
Figure 5B:
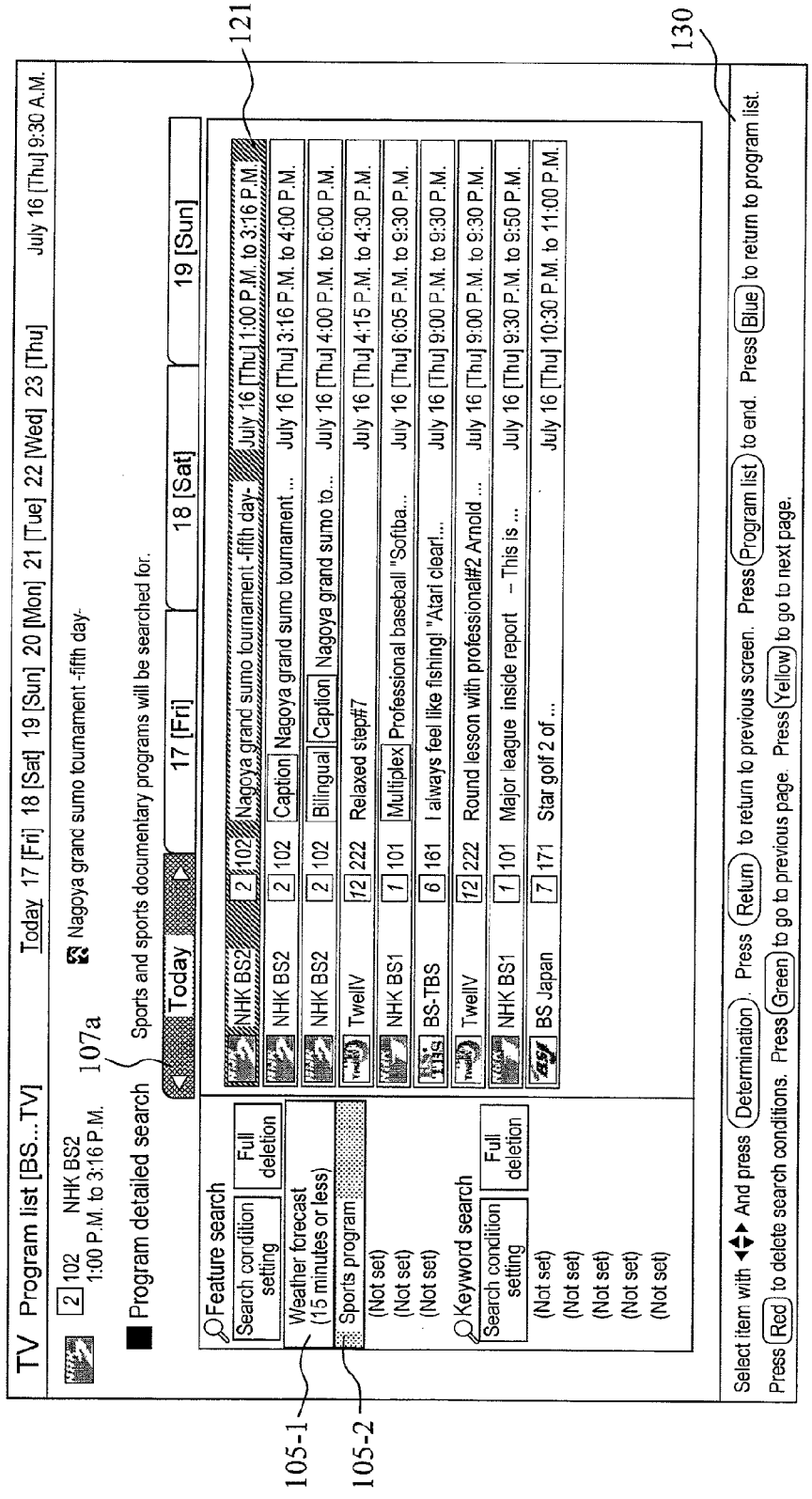
FIG. 5B is a view showing an aspect of screen switching based on a content search and notification technique according to the first embodiment of the present invention, which is the view showing the aspect of screen switching in the case of performing a feature search (a category search).
Figure 6:
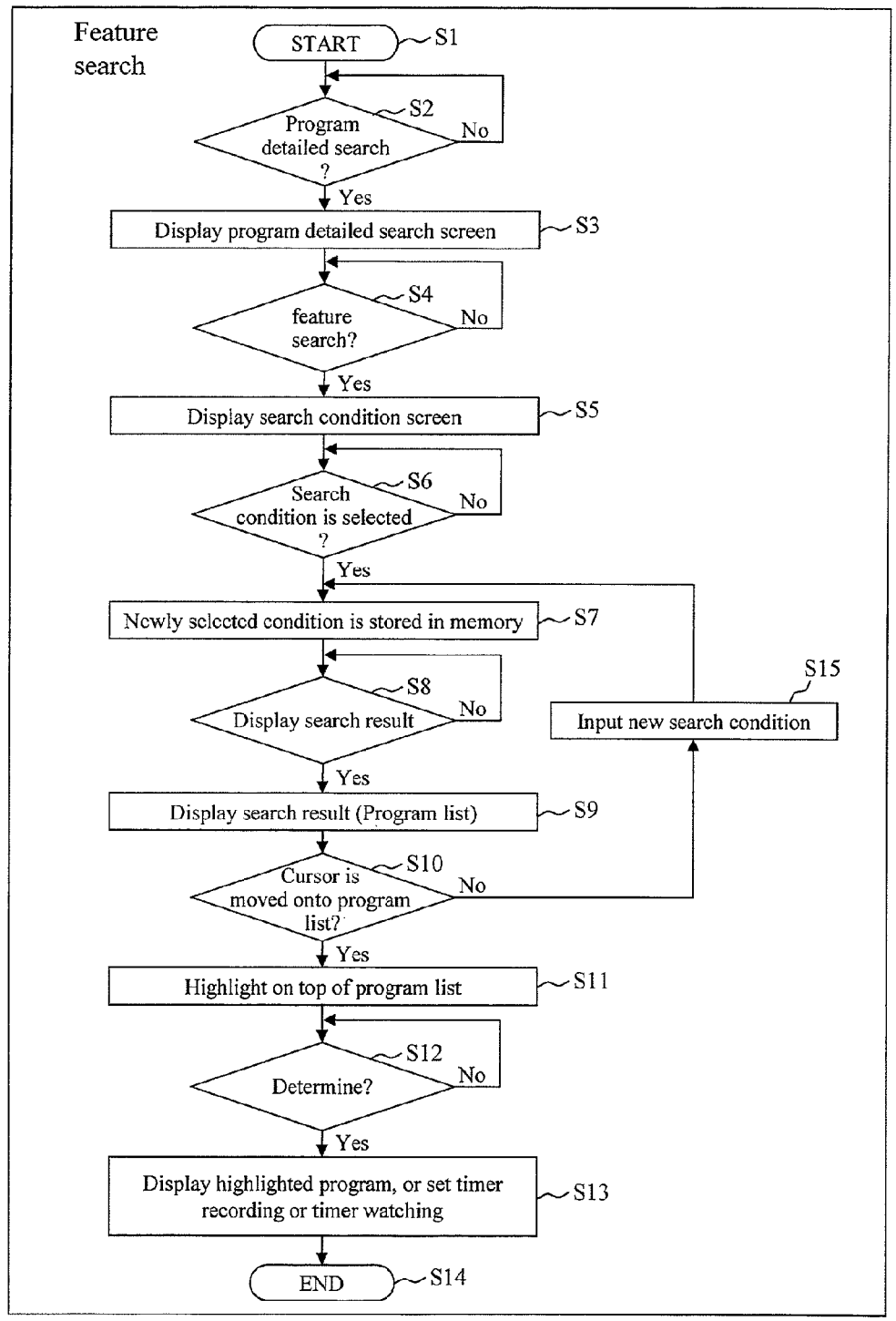
FIG. 6 is a flowchart showing a flow of category search processing according to this embodiment.

FIG. 3 to FIG. 5 are views showing aspects of screen switching based on a content search and notification technique according to a first embodiment of the present invention, which are the views showing the aspects of screen switching in the case of performing a feature search (a category search). FIG. 6 is a flowchart showing a flow of processing of the content search and notification technique according to this embodiment in the case of performing the feature search (the category search). First, a screen shown in FIG. 3A is displayed when a television receiver device is turned on and the search button 67 of a remote controller is pressed while the display unit 21 thereof is being displayed. A display screen 71 on the display unit shown in FIG. 3A is structured as described below.

First, there is a top region on the display screen 71 and a target function display region 73 for a current program search is provided in the top region. In this example, the region indicates a search in a television program table and a fact that a search target is a BS (broadcasting satellite) television. Likewise, a date display region 75 for dates and days of the week (displayed as today for indicating a current day) and a current date and day display region 77 are provided in the top region. The date display region 75 is devised to include an underline 79 drawn below a currently selected date, for example.

A side region (on the left side in this drawing) on the display screen 71 is provided with a search condition display region 81 for displaying and selecting a condition for searching for details of a program. This region can display a list of various search conditions. Broadly speaking, the search condition display region 81 in this example is provided with a first search condition display region which includes a feature search display button 83a for a feature search 83 that uses a characteristic (a category) of a program as a search condition, a full deletion button 83b, and a search condition list display region 83c, and a second search condition display region which includes a keyword setting button 85a for a keyword search 85 that uses an inputted keyword as a search condition, a full deletion button 85b, and a search condition list display region 85c. In FIG. 3A, the feature search display button 83a is selected but no search conditions are displayed on a list (not set). Hence a notice such as "PLEASE PRESS DETERMINATION BUTTON TO SET SEARCH CONDITIONS FOR FEATURE SEARCH. PROGRAMS MATCHING SELECTED CONDITIONS WILL BE SEARCHED FOR." is displayed in a search result display region 91 in the center. In FIG. 3A, since the feature search display button 83a is selected and highlighted, the processing proceeds to FIG. 3B and a search condition selection screen 101 is displayed in the search result display region 91 in the center.

In this search condition selection 101, numerous search condition items are arranged in a matrix fashion, for example, so as to enable selection of a search condition based on a characteristic condition. It is possible to select and determine an item by using the direction keys and the determination key on the remote control device. Here, a category "sports" is selected as a selection condition, for example. When the determination key is pressed in this state, as shown in FIG. 3C, the category "sports" is displayed in a selected state on the top of the search condition list display region 83c and is selected as the selection condition for the sports category. Together with other conditions currently selected, namely, the BS television and today, all the programs being broadcast today or about to be broadcast on the BS television and satisfying the category "sports" are extracted and displayed on a list 111. Specifically, since the category is included as attribute information of a program in program information contained in a broadcast wave, the broadcast programs including the category that matches the category selected as described above are extracted, for example. The extracted programs are arranged in the order of start time of broadcast, for example. Reference numeral 107 denotes a time slot selection button and reference numeral 107*a* denotes a today button. It is also possible to select other time slots. A broadcast station icon 113, a broadcast station name 115, a channel number, a service ID 117, a title 121, and a broadcast time slot 123 are displayed on each row on the program list so as to check an outline of the program. Here, a sports category 105-1 in the search condition list display region 83*c* is highlighted.

If the determination button is pressed again in this state, the search condition selection screen 101 is displayed as shown in FIG. 4A as similar to FIG. 3B. Here, by selecting a category other than sports programs 103, namely, weather forecast (within 15 minutes) 131 in this case, the category "weather forecast" is set to a selected state and the sports programs 103 representing the category which is the category selected immediately before and being currently displayed on the list 111 are indicated as being previously selected and still active.

Here, when the determination button on the remote controller or the like is pressed, a list of the category "weather forecast (within 15 minutes)" is displayed on the first row 105-1 above (on the top of) the category "sports" which is previously selected. Moreover, based on the search condition of the category of the "weather forecast (within 15 minutes)" and on other conditions currently selected, namely the BS television and today, all the programs being broadcast today or about to be broadcast on the BS television and satisfying the category "weather forecast (within 15 minutes)" are extracted and displayed on a list 135. The sports program satisfying the previously selected condition is displayed on a second row 105-2. By moving a highlighted position from the weather forecast on the first row 105-1 to the sports program on the second row 105-2, the program list for the sports programs can be also displayed again as shown in FIG. 5A. As shown in FIG. 5B, when the highlighted position is moved from the state shown in FIG. 5A to the list, the highlight moves to the topmost program 121 as shown in FIG. 5B. Here, the program is reproduced by pressing the determination button. Guidance for other operations is displayed in a bottom region 130 on the screen. Hence, the operations can be performed in accordance therewith. Note that the search condition selection screen shown in FIG. 3B or FIG. 4A can also be used as a user interface for changing the display order (105-1 to 105-*n*, n is an integer equal to or greater than 1) of the category list displayed in the search condition list display region 83*c*. For example, the order can be changed by selecting the category, inputting the order by using a numerical button, for example, so as to modify a link between the order and the category. Moreover, it is also possible to change the order or the item of the previously selected category on this screen.

Further, other selectable categories or sub-categories as a sub-menu can also be displayed by highlighting a certain category item while a category list is being displayed, and to display different lists by selecting these items. By switching the display of the screen for inputting the search condition such as the category or the keyword and the screen for displaying the program list as described above, there is an advantage of enabling display of setting of search conditions and display of selection of a program including a search result to be provided in a large scale and thereby to be easily handled.

The aforementioned operations will be described below in detail. FIG. 6 is the flowchart showing the flow of category search processing according to this embodiment. First, in step S1, the processing is started by pressing a home button or the like. Then, whether or not an operation for a program detailed search is made is detected (step S2). When the operation is detected (YES), a program detailed search screen is displayed in step S3. Then, the process goes to step S4. When press of a characteristic (category) search operating button is detected (YES), a search condition screen is displayed in step S5. When a search condition is selected on this screen in step S6 (YES), a category search condition thus selected is stored in a memory in step S7. Subsequently, when an operating signal for executing display of a search result is detected in step S8 (YES), display of the search result (a program table list) as shown in FIG. 3C is performed in step S9. Here, when a cursor is moved between the displayed categories, the programs searched for in the category corresponding to the cursor are displayed on the list. Subsequently, when a movement of the cursor onto the program list is detected (YES) as shown in step S10, the process goes to step S11. If there is no movement of the cursor onto the program list (NO), the display is switched to a category search condition input screen, and a new search condition can be inputted in step S15. Then the process returns to step S7.

In step S11, the program displayed on the top of the program list can be highlighted, and moreover the highlighted position can be moved. When the determination button is pressed in step S12 (YES), the highlighted program can be displayed on the display unit in step S13. Alternatively, timer recording or timer watching of the highlighted program can be set. Note that which of the above-mentioned processing is actually performed depends on the specifications. Or, a next desired operation can be set by using a menu. Otherwise, all the items for selection can be displayed on a screen. Alternatively, it is also possible to learn in the first place on the selection screen and to perform the processing corresponding to the item later along with accumulation of operation histories. In this way, the processing is terminated (end: step S14).

Figure 7B:
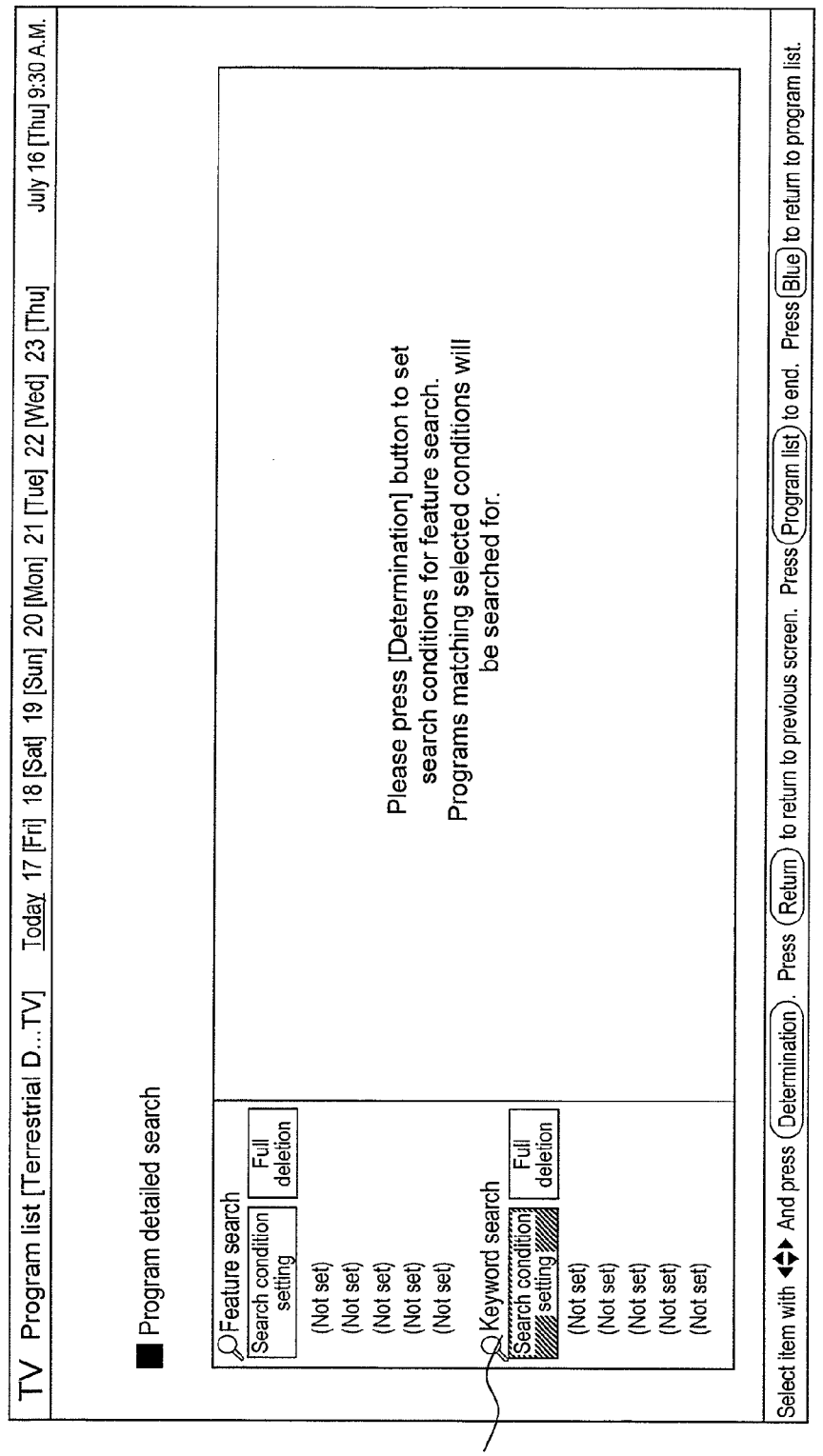
FIG. 7B is a view showing an example of screen switching based on a search technique by a keyword search according to the second embodiment of the present invention.
Figure 7C:
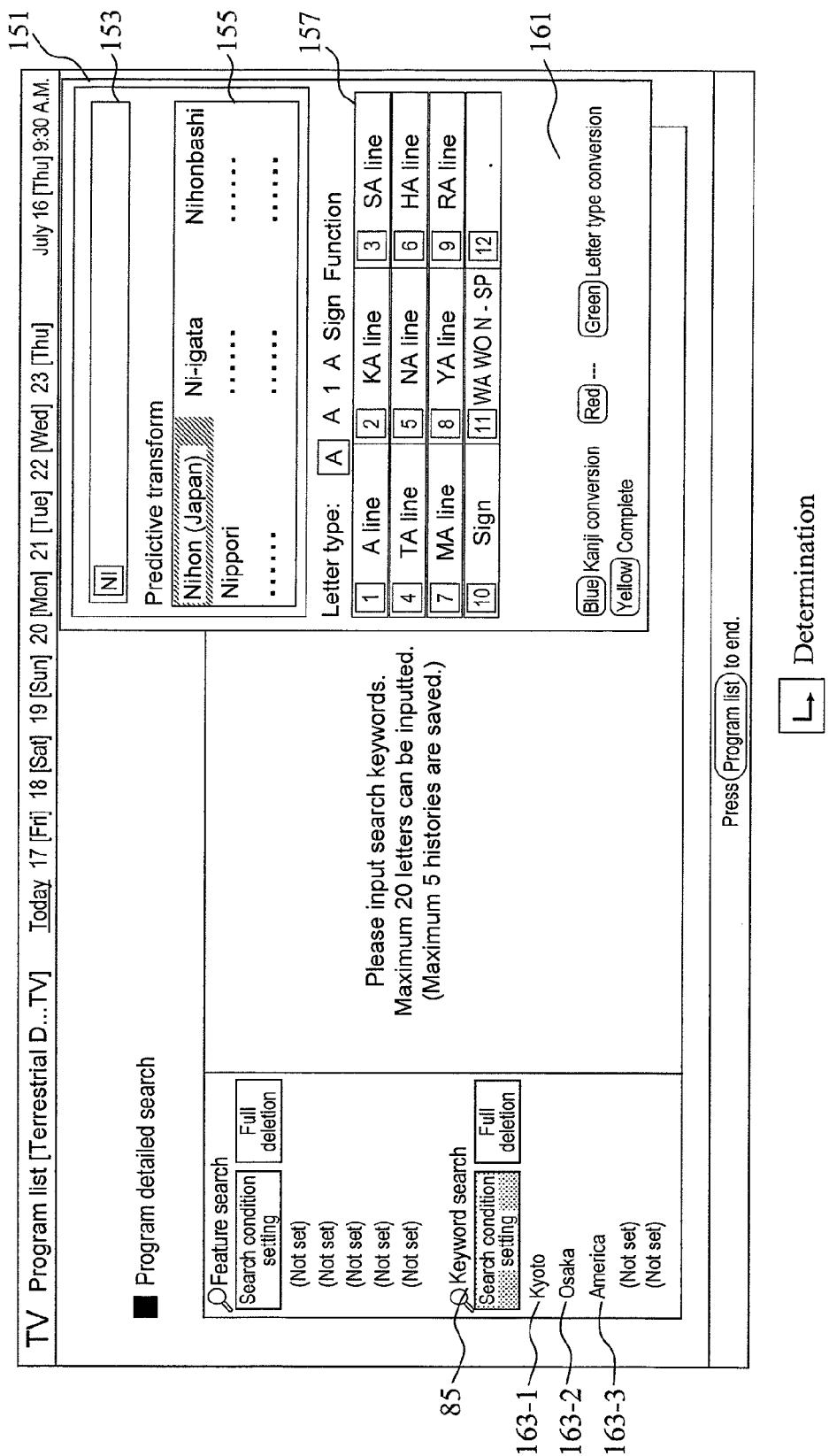
FIG. 7C is a view showing an example of screen switching based on a search technique by a keyword search according to the second embodiment of the present invention.
Figure 8A:
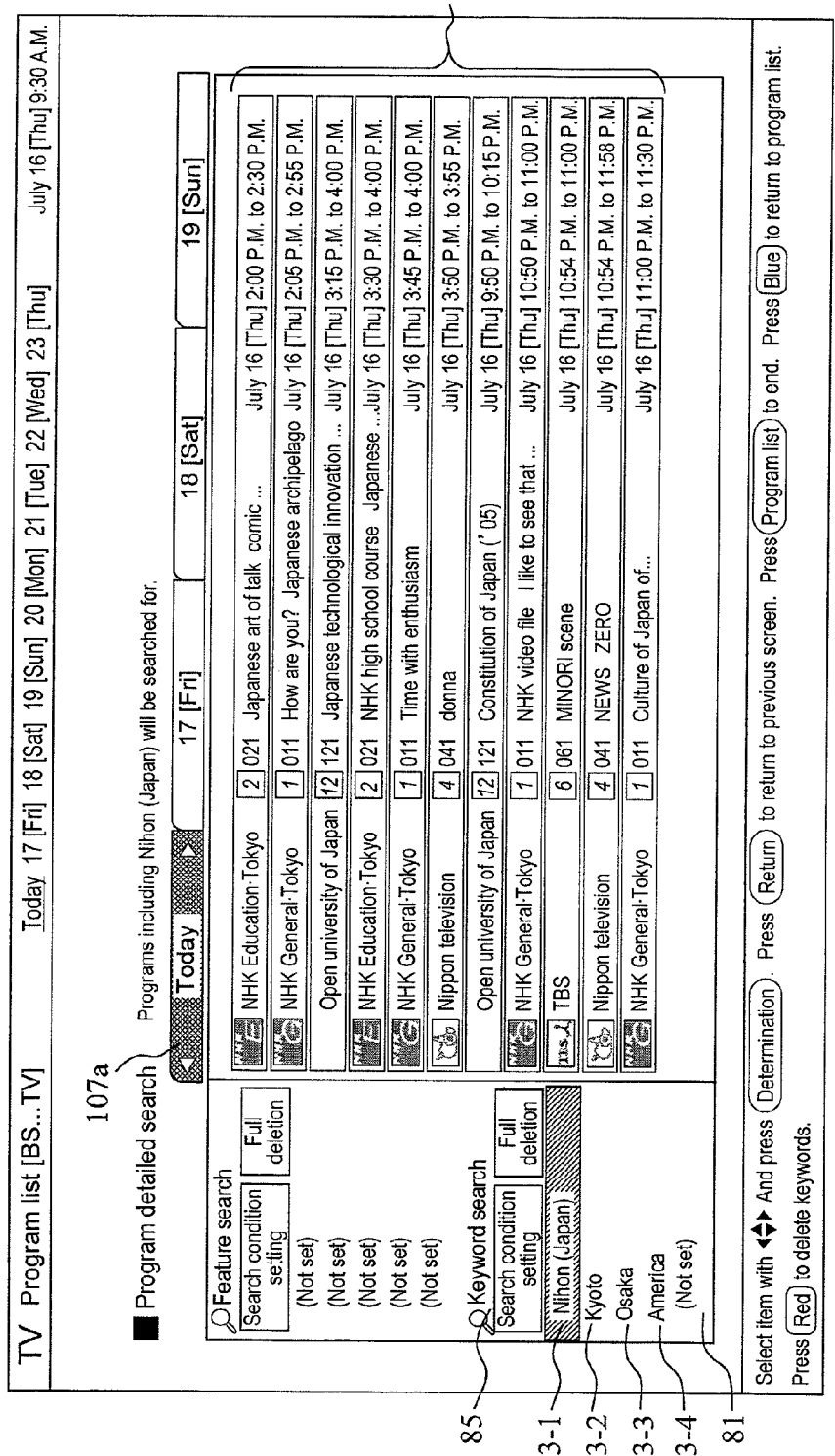
FIG. 8A is a view showing an example of screen switching based on a search technique by a keyword search according to the second embodiment of the present invention.
Figure 8B:
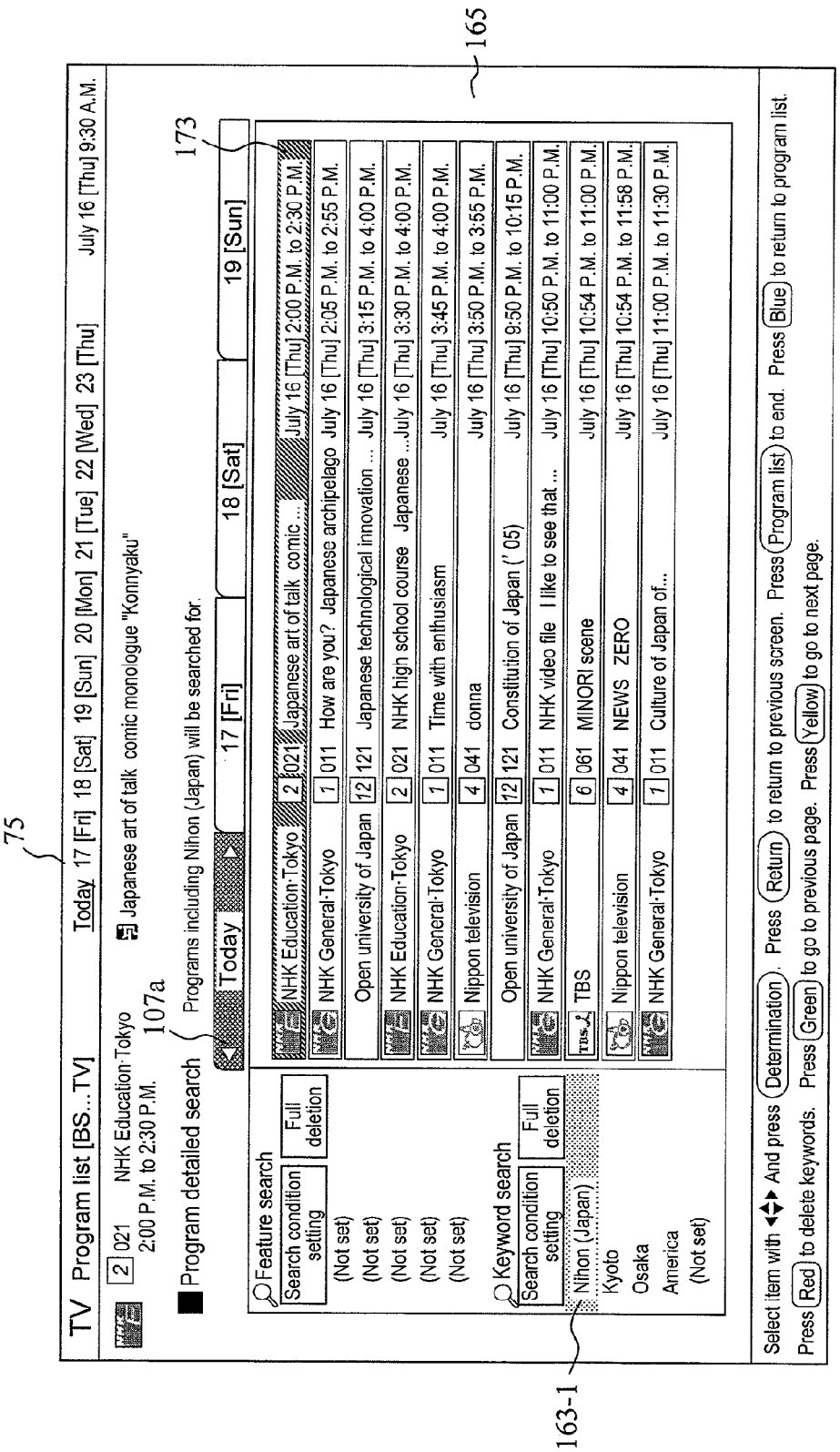
FIG. 8B is a view showing an example of screen switching based on a search technique by a keyword search according to the second embodiment of the present invention.

Next, a program search technique according to a second embodiment of the present invention will be described with reference to the accompanying drawings. FIGS. 7 and 8 are views showing an example of screen switching based on a search technique by a keyword search among program searches according to this embodiment. The view shown in FIG. 7A represents the screen similar to the screen in FIG. 3A. When the keyword search 85 is selected on this screen and the determination button on the remote controller or the like is pressed as shown in FIG. 7B, a keyword input screen 151 is displayed as shown in FIG. 7C. The keyword input screen 151 is provided with character input buttons 157, a guidance display region 161, and a translation candidate character display region 155. Characters inputted by using these constituents are displayed in an inputted character display region (a keyword display region) 153. FIG. 7C shows display on the assumption that the keywords "America" (163-3 on a third row), "Osaka" (163-2 on a second row), and "Kyoto" (163-1 on a first row) have already been inputted. The description will be continued below in the case of newly inputting another keyword "Japan". When "Japan" is inputted as the keyword, the keyword "Japan" is displayed on the first row 163-1 as shown in FIG. 8A in a position above the keywords "America" (163-4 on a fourth row), "Osaka" (163-3 on the third row), and "Kyoto" (163-2 on the second row) which have already been displayed in FIG. 7C. In this case, each of the keywords inputted and displayed in the past is shifted downward by one row while the most recently inputted keyword is displayed on the topmost row 163-1. In addition, the highlighted position moves to this keyword. Specifically, the items set up as the keywords are displayed on a list like "Japan", "Kyoto", "Osaka", and "America" and are arranged in descending order so as to put the newest keyword on the top. On the screen shown in FIG. 8A, a group of programs that include the keyword "Japan" in the program information similar to the above description, for example, in titles, subtitles, performers, and summaries of the contents are extracted and the programs including the keyword "Japan" are displayed on a list 165 as a search result.

As the highlight is moved to the program list, a program 173 on the top of the list is supposed to be highlighted. Another algorithm can also be used to determine which program is supposed to be highlighted, based on the view history, for instance. In this state, one of the displayed programs can be selected by moving the highlight. When the highlight is moved back to the search display, a desired keyword can be selected from candidates of the keyword research.

Figure 9:
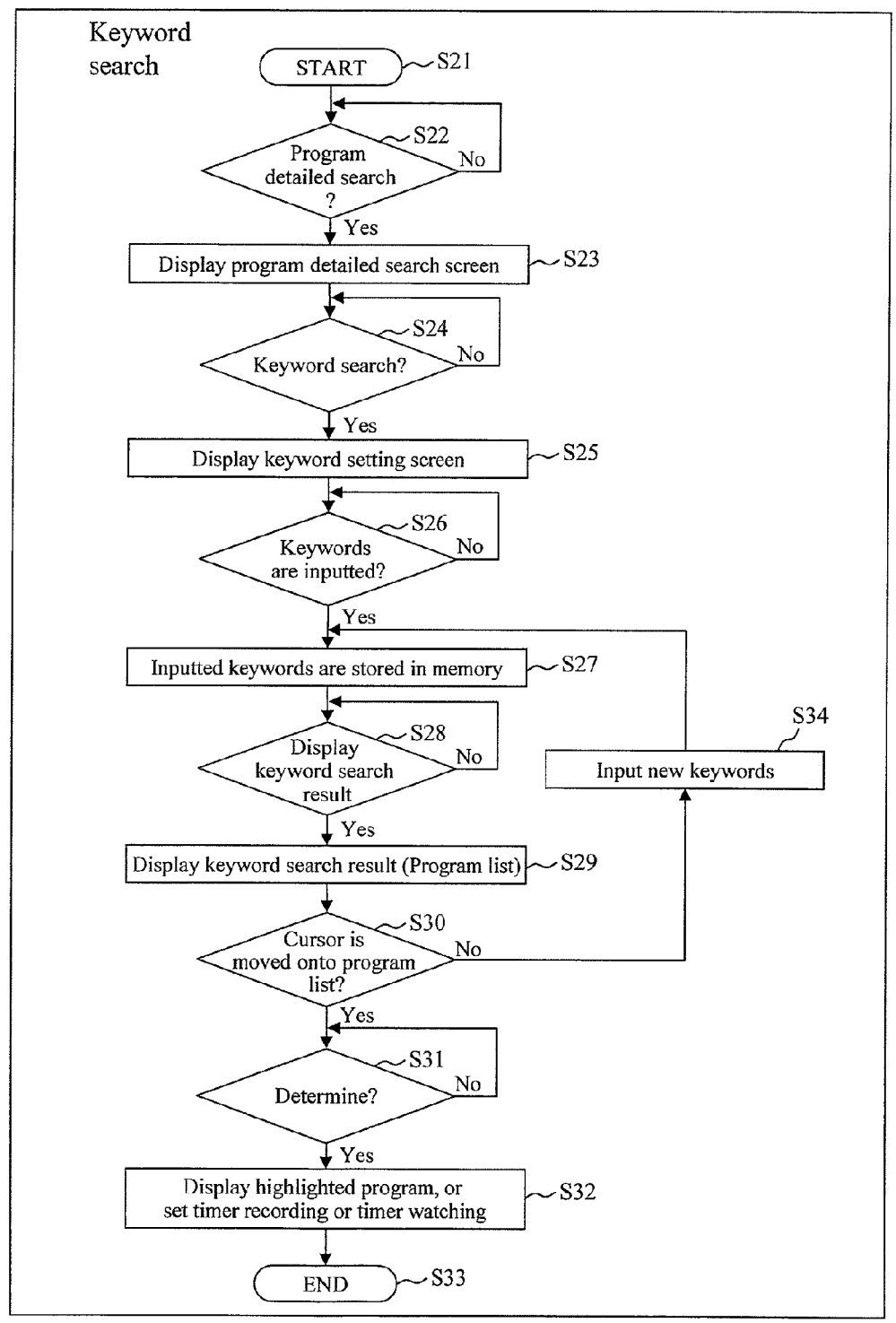
FIG. 9 is a flowchart showing a flow of keyword search processing according to this embodiment.

FIG. 9 is a view showing a flow of keyword search processing according to this embodiment. First, in step S21, the processing is started by pressing the home button or the like. Then, whether or not the operation for the program detailed search is made is detected (step S22). When the operation is detected (YES), the program detailed search screen is displayed in step S23. Then, the process goes to step S24. When press of a keyword search operating button is detected (YES), the keyword setting screen is displayed as shown in FIG. 7C in step S25. When a keyword is inputted on this screen in step S26 (YES), the inputted keyword is stored in the memory in step S27.

Subsequently, when an operating signal for executing display of a keyword search result is detected in step S28 (YES), display of the search result (the program table list) as shown in FIG. 8A is performed in step S29. Here, when the cursor is moved between the displayed categories, the programs searched for in the category corresponding to the cursor are displayed on the list. Subsequently, if a movement of the cursor onto the program list is detected (YES) as shown in step S30, the highlight moves to the program in the topmost position on the program table, for example. When the determination button is pressed in step S31, the program is displayed and becomes viewable (step S32). Alternatively, timer recording or timer watching of the highlighted program can be set. Note that which of the above-mentioned processing is actually performed depends on the specifications. Or, a next desired operation can be set by using a menu. Otherwise, all the items for selection can be displayed on a screen. Alternatively, it is also possible to learn in the first place on the selection screen and to perform the processing corresponding to the item later along with accumulation of operation histories. In this way, the processing is terminated (step S33: end).

When an operation for executing a new keyword research is detected in step S30 instead of the movement of the cursor onto the program list, the new keyword research is executed in step S34 and then the process returns to step S27. The other processes are similar to those of the category search processing.

As described above, the programs having the titles and the program information containing the keyword inputted by the user are searched for in the keyword search processing according to this embodiment. Here, it is possible to display the program table undergoing the keyword search can be displayed on the list by adding the keywords that are stored in the memory as the search conditions to the keyword display list as shown in FIG. 8A and the highlighting this display. Accordingly, it is possible to select and watch a desired program based on the program table list displayed as the search result while arbitrarily adding and changing search items.

Figure 15:
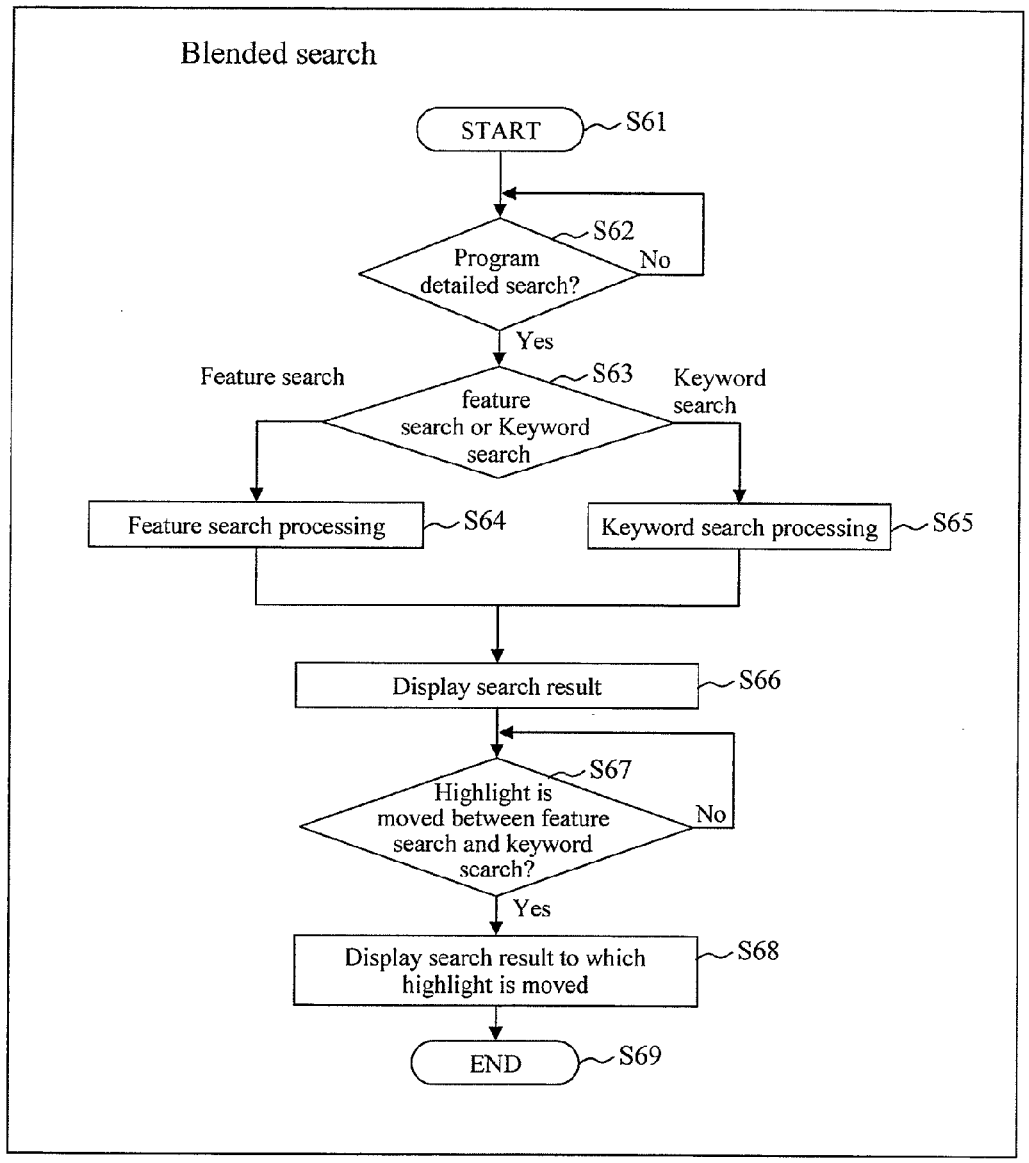
FIG. 15 is a flowchart showing a relationship of processing between the category search according to the first embodiment and the keyword search processing according to the second embodiment.

Moreover, it is possible to switch to the keyword search screen from any condition. This enables execution of a new keyword search at any timing and to display a program list that corresponds to display of a keyword list while adding a search result thereof. Therefore, a desired program can be selected and watched by utilizing the results of the keyword searches in the past and the result of the new keyword search. Furthermore, the result of the category search according to the first embodiment is also displayed on the list. Hence it is possible to select desired search conditions and to select a program on one screen while combining the results of the category search and the keyword search. A relationship of the processing between the category search according to the first embodiment and the keyword search processing according to the second embodiment will be described with reference to FIG. 15. First, in step S61, the processing is started by pressing the home menu button or the like. When the operation for executing the program detailed search is detected in step S62 (YES), any of the category (characteristic) search and the keyword search is selected in step S63. Then, the category (characteristic) search processing is carried out in step S64 in the former case while the keyword search processing is carried out in the latter case (step S65). In any case, the search result is displayed in step S66. When the movement of highlight between the category (characteristic) search and the keyword search is detected in step S67 (YES), the search result based on the search condition at the destination of the highlight movement is displayed in step S68. These steps of the processing can be repeatedly executed. Here, it is also possible to move to the search condition selection screen shown in FIG. 3B when moving to the category search. In this way, it is not necessary to go back to the program detailed search screen below if the program search can be made by switching between the category (characteristic) search and the keyword search by way of the highlight movement. Hence there is an advantage to simply the operations.

Next, a program search technique according to a third embodiment of the present invention will be described with reference to the accompanying drawings. The program search technique of this embodiment relates to deletion of a keyword which is used for the program search in accordance with the above-described second embodiment. Here, an example of deleting the search condition for the keyword search of the second embodiment will be described. However, it is also possible to delete the detection conditions by use of a full deletion button and an individual deletion button similarly in the case of the category search. Of course, it is also possible to delete the search conditions on a category condition selection screen in the case of the category search. Now, keyword deletion processing started from the screen in FIG. 8B, namely, in the case of setting the "Osaka", "Kyoto", "Japan", and "America" as the search conditions by the keyword input, will be described below.

Figure 10A:
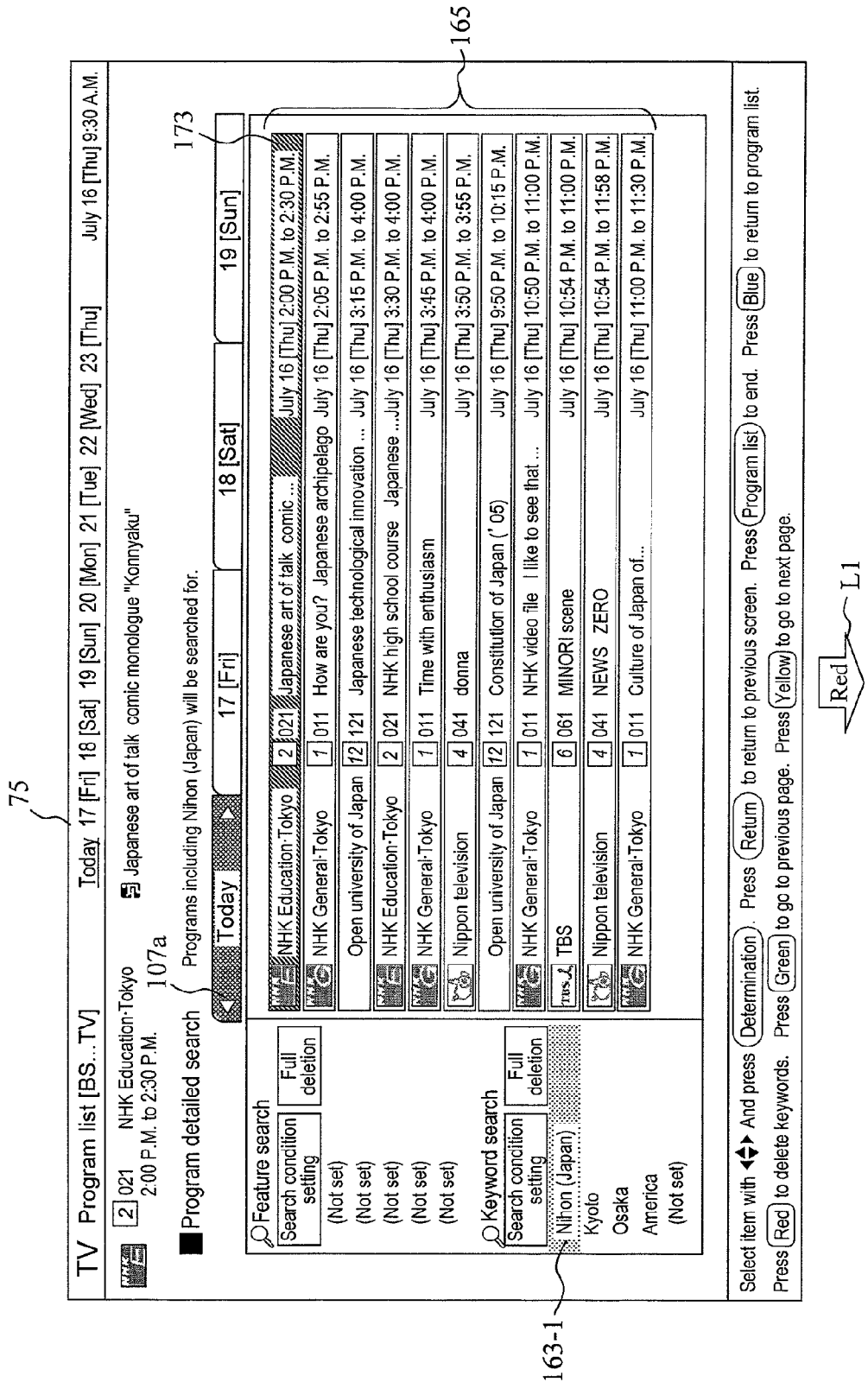
FIG. 10A is a view showing an example of screen switching in the case of individual deletion in a program search technique according to a third embodiment of the present invention.
Figure 10B:
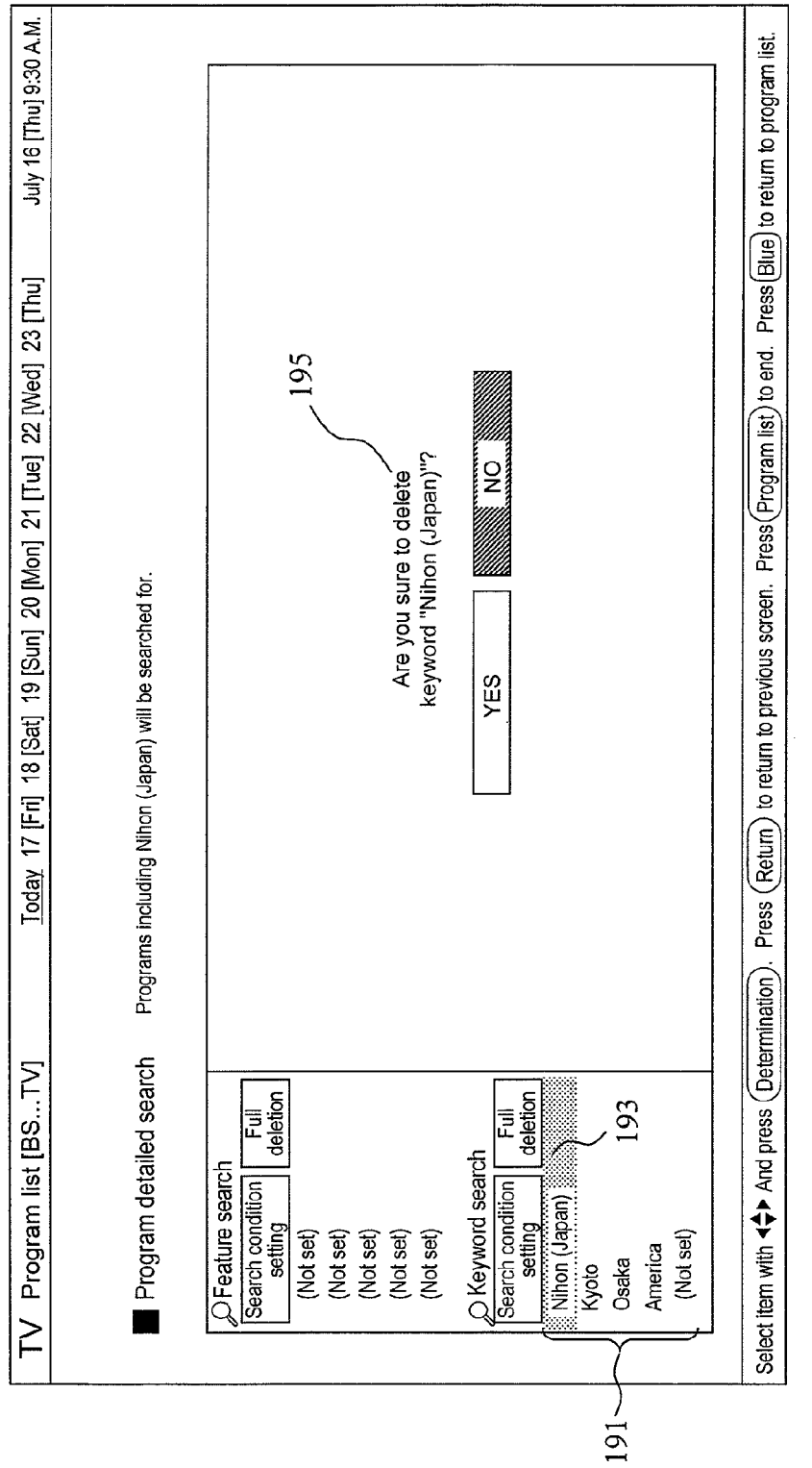
FIG. 10B is a view showing an example of screen switching in the case of individual deletion in a program search technique according to the third embodiment of the present invention.

1) Individual deletion (FIG. 10): An aspect of individually deleting the keyword "Japan" among the keywords "Osaka", "Kyoto", "Japan", and "America" that are stored as the search keywords in the memory and displayed on the list in the keyword search display 85 on the keyword search screen based on the memory will be described in this individual deletion, for example. First, on the screen shown in FIG. 10A, the keyword "Japan" 163-1 to be deleted is highlighted by moving the cursor thereon and then a button (such as a red button) provided on the remote control device 35 and allocated to the deletion processing is pressed. Then, a screen 195 for confirming whether or not the user is really sure to delete the keyword is displayed as shown in FIG. 10B. Here, when the user selects and determines a YES button, only the keyword "Japan" that is individually selected out of the group of keywords is deleted from the memory as an invalid keyword and the item "Japan" previously displayed on the list in the display of the keyword search 85 will no longer be displayed, as shown in FIG. 10C.

Figure 10C:
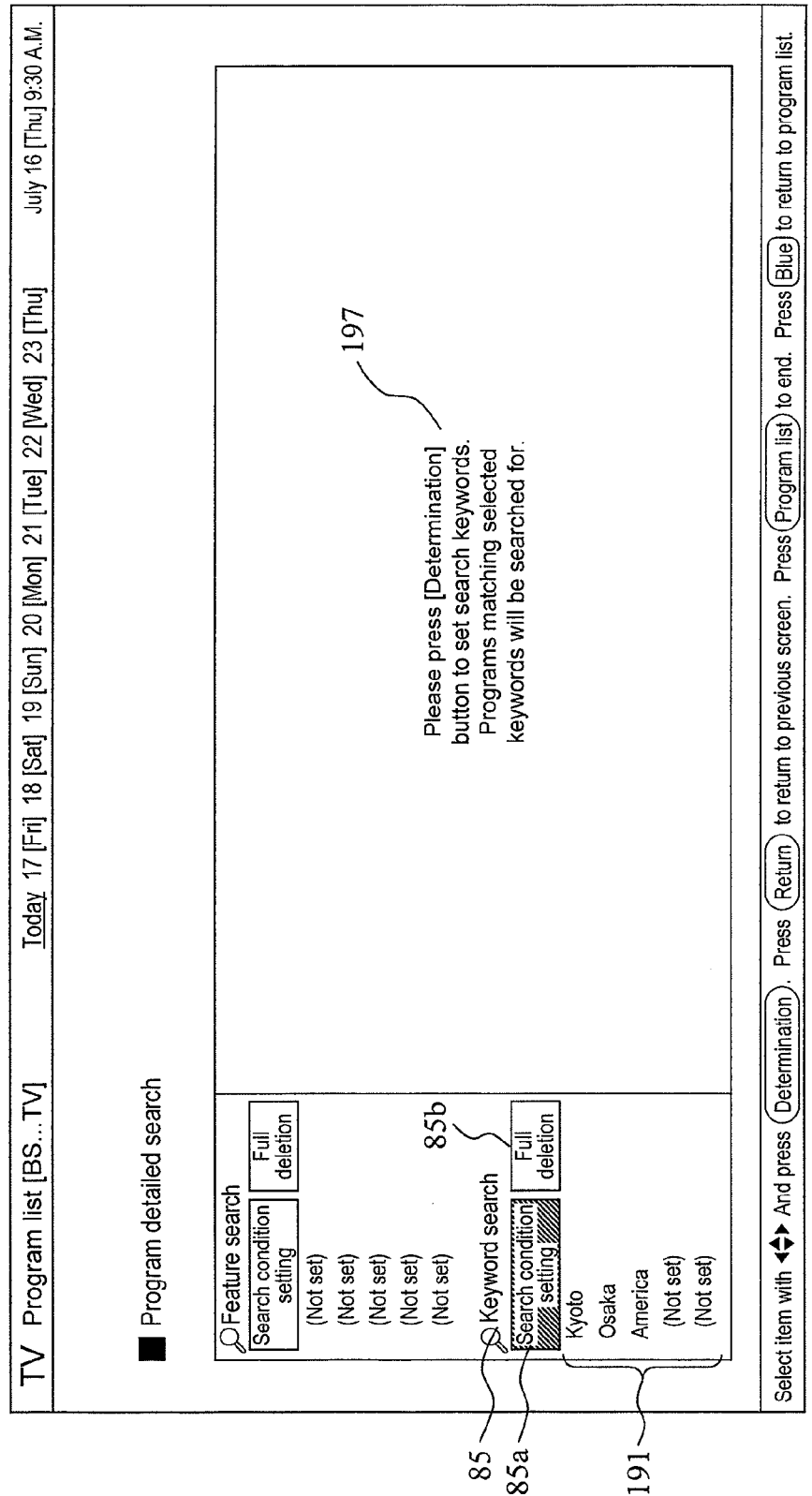
FIG. 10C is a view showing an example of screen switching in the case of individual deletion in a program search technique according to the third embodiment of the present invention.

Next, as shown in FIG. 10C, the display screen becomes similar to FIG. 7B. Specifically, the keyword setting button 85a becomes selectable and the items "Kyoto", "Osaka", and "America" except the deleted item "Japan" are displayed as the keywords (191). Meanwhile, a message to prompt input of a new search keyword is displayed in a list display region 197.

Figure 11:
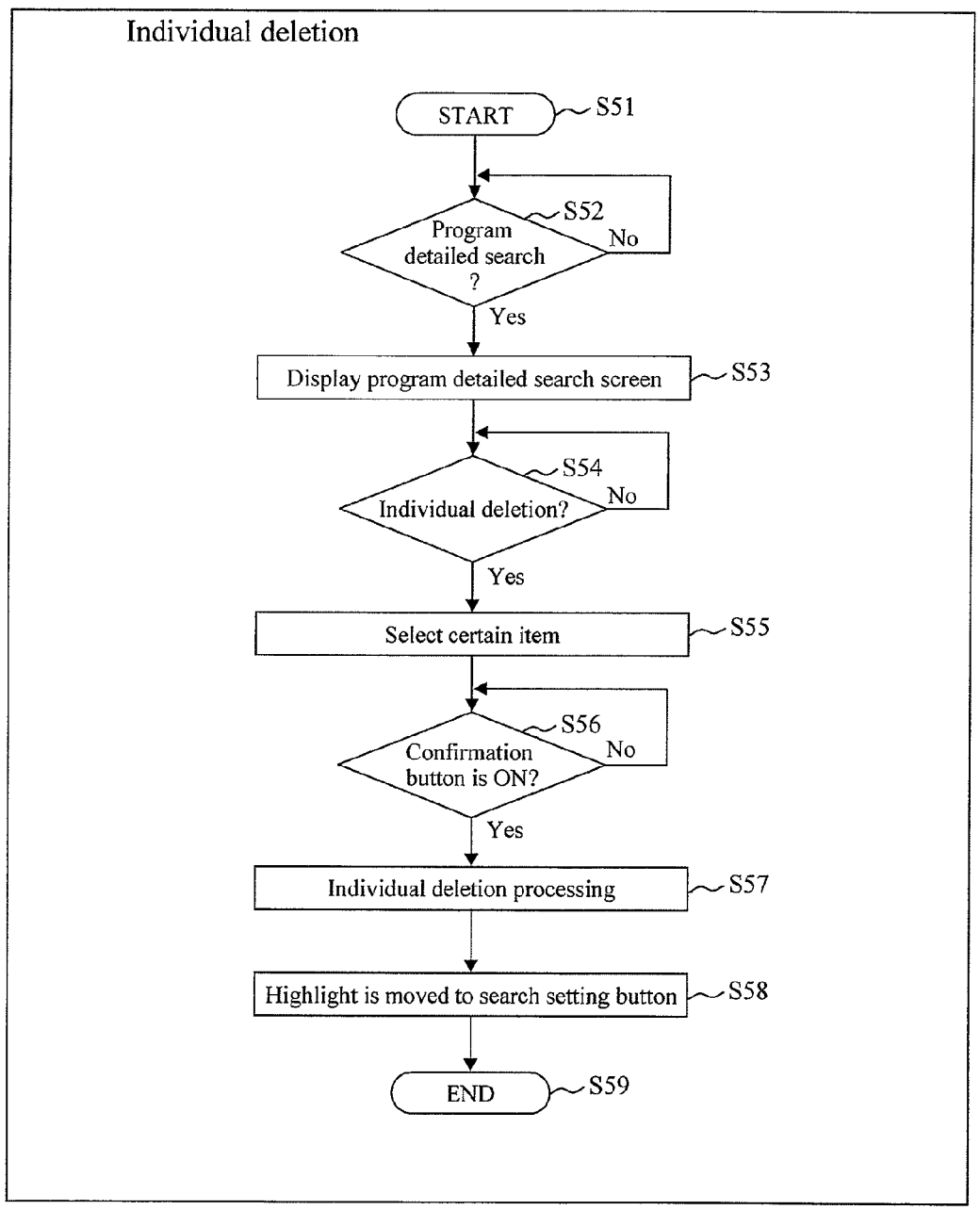
FIG. 11 is a flowchart showing a flow of individual deletion processing according to this embodiment.

FIG. 11 is a flowchart showing a flow of the above-described individual deletion processing. As shown in FIG. 11, the individual deletion processing is firstly started in step S51 and an operation for prompting the program detailed search processing is detected (YES) in step S52. In step S53, the program detailed search screen is displayed as shown in FIG. 10A. In step S54, processing for individual deletion such as selection of a certain keyword item (highlighting the keyword) and press of the deletion button as described above is detected. Subsequently, upon detection of a signal indicating YES by using a confirmation button as shown in FIG. 10B (YES) in step S56, the individual deletion processing of the actually selected keyword item is executed, i.e., the item individually selected as described above out of the keywords registered with the memory is deleted. In step S58, the highlight is moved to the search setting button 85a as shown in FIG. 10C so as to perform the display to prompt setting of a new keyword. Then this process is terminated (step S59).

Figure 12A:
FIG. 12A is a view showing an example of screen switching in the case of full deletion in the program search technique according to the third embodiment of the present invention.
Figure 12B:
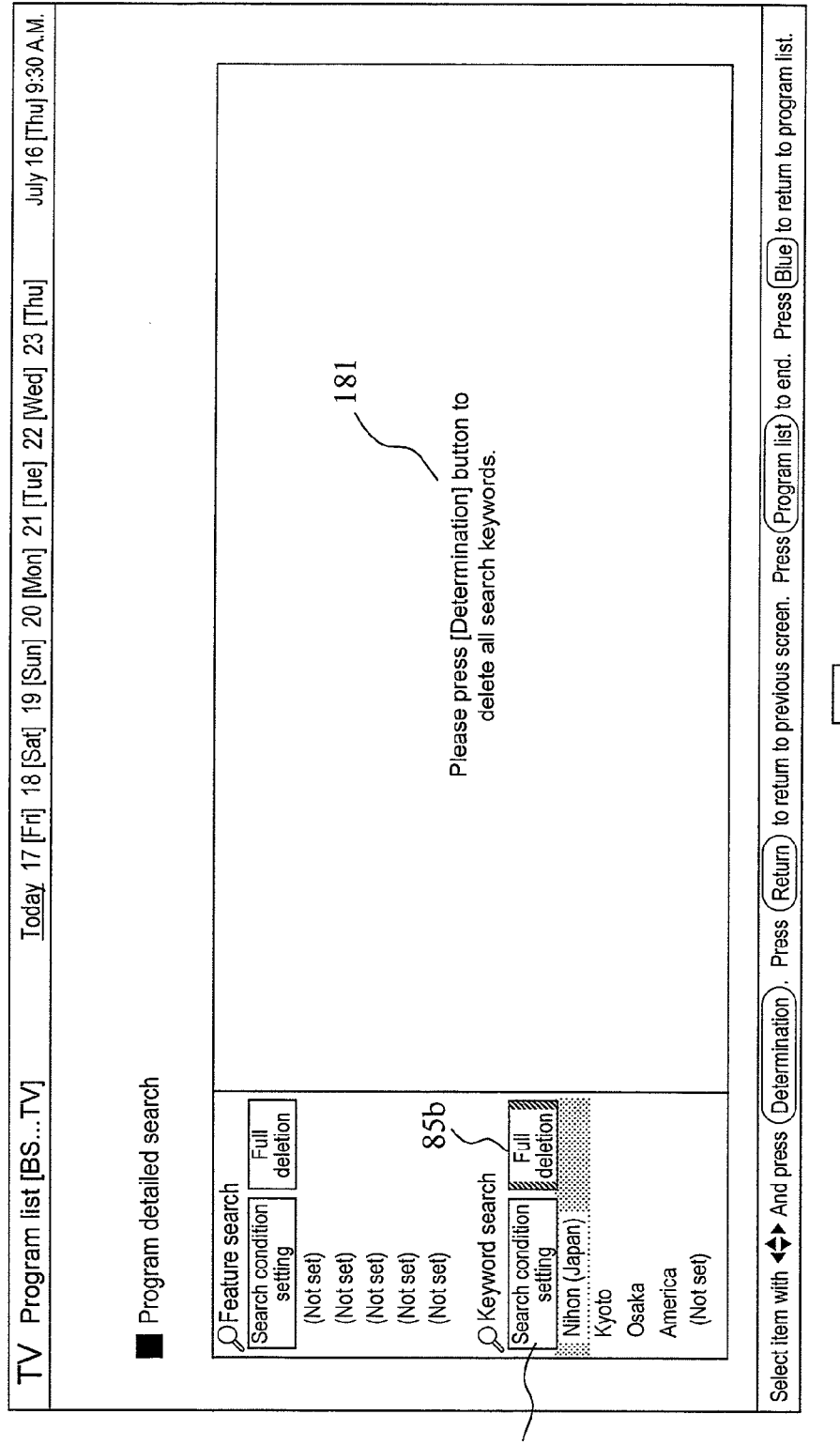
FIG. 12B is a view showing an example of screen switching in the case of full deletion in the program search technique according to the third embodiment of the present invention.
Figure 13A:
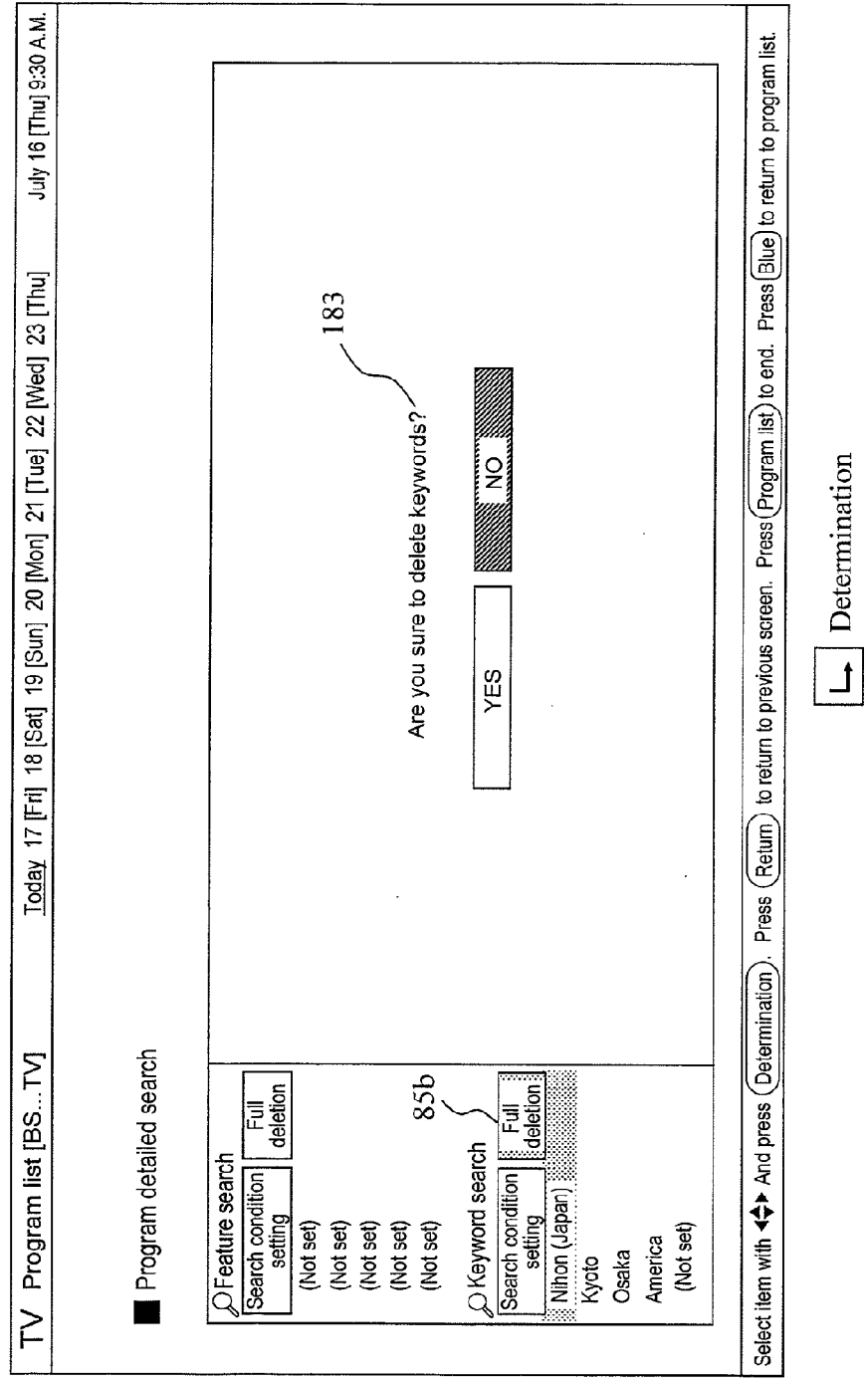
FIG. 13A is a view showing an example of screen switching in the case of full deletion in the program search technique according to the third embodiment of the present invention.
Figure 13B:
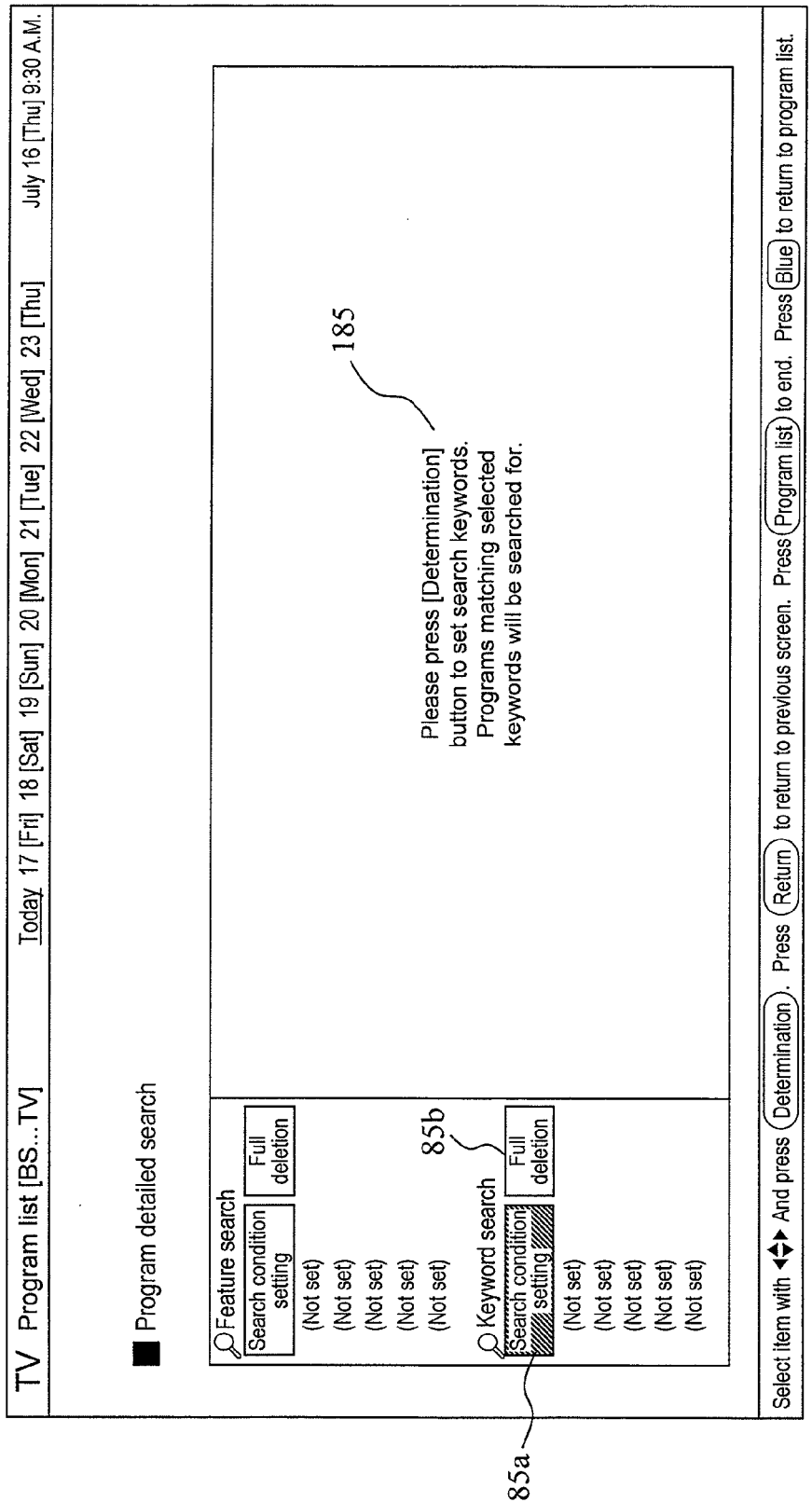
FIG. 13B is a view showing an example of screen switching in the case of full deletion in the program search technique according to the third embodiment of the present invention.

2) Full deletion (FIG. 12): Full deletion is to delete all the keywords "Osaka", "Kyoto", "Japan", and "America" that are stored as the search keywords in the memory and displayed on the list in the keyword search display 85 on the keyword search screen based on the memory. The aspect will now be described. First, in FIG. 12A or on the screen shown in FIG. 10A, the cursor is moved onto the full deletion button 85b (FIG. 12B) provided beside the keyword search button. Here, a message 181 such as "PRESS DETERMINATION BUTTON TO DELETE ALL THE KEYWORDS" is displayed in the program list display region as shown in FIG. 12B. When the determination button is pressed, a confirmation screen 183 for confirming whether or not to perform full deletion is displayed as shown in FIG. 13A. When the user selects "YES" and presses the determination button, the keyword research is fully deleted as shown in FIG. 13B and the highlight moves to the search keyword setting button 85a. At the same time, a message 185 such as "PLEASE PRESS DETERMINATION BUTTON TO SET SEARCH KEYWORD, SO THAT YOU CAN SET UP A NEW KEYWORD" is displayed. By performing the above-described operations, it is possible to delete all the search keywords.

Figure 14:
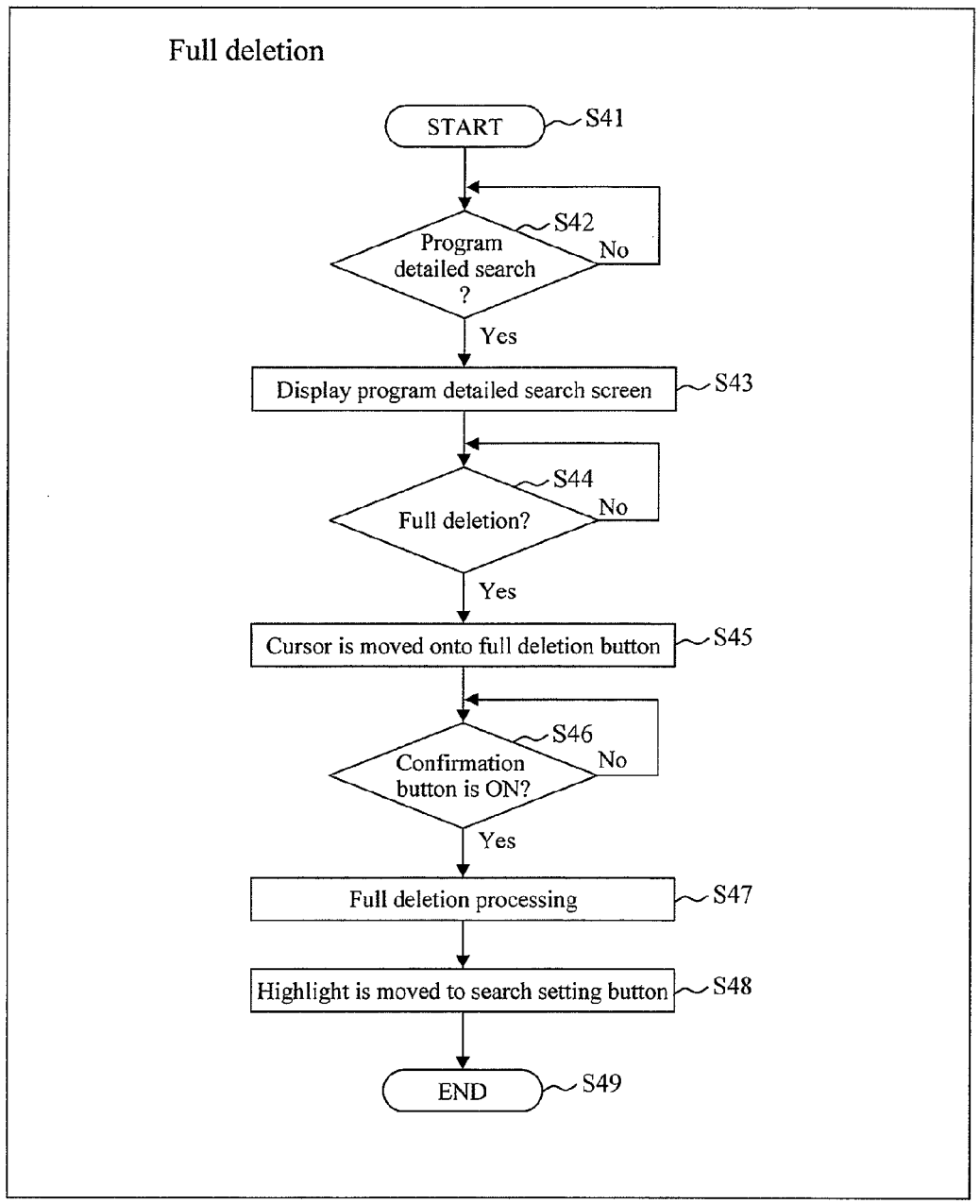
FIG. 14 is a flowchart showing a flow of full deletion processing according to this embodiment.

FIG. 14 is a flowchart showing a flow of full deletion processing for the search keywords. As shown in FIG. 14, the full deletion processing is firstly started in step S41. When an operation of the program detailed search processing (by pressing the home button) is detected (YES), the program detailed search screen is displayed in step S43. Subsequently, when full deletion is executed in step S44 (YES), the process goes to step S45 in which the cursor is moved onto the full deletion button. When the confirmation button is turned ON in step S46 (YES in step S46), the process goes to step S47 in which the full deletion processing is executed for deleting all the search condition items. Subsequently, the highlight is moved onto the search setting button in step S48, and the processing is terminated in step S49 (end).

Accordingly, the keywords of "Osaka", "Kyoto", "Japan", and "America" which are stored as the keywords in the memory and displayed on the list in the keyword search display 85 on the keyword search screen based on the memory can be deleted all together. Selection of the individual deletion or the full deletion is voluntary.

As described above, switching display of the screen for inputting the search condition such as a characteristic (category) or a keyword and the screen for displaying a program list enables display of setting of search conditions and display of selection of a program including a search result to be provided in a large scale, and thereto to be easily handled.

Moreover, a result is displayed immediately after a user executes a search by inputting a keyword for searching for a program and a condition such as any program information, and a highlighted position is automatically aligned with an immediately precedent search item. Hence there is an advantage that it is easier to perform a movement for a condition input for the next search item and to perform a highlight movement for displaying a search result. Specifically, there is an advantage that it is easier to check display of a result of the program search and to move to the next search.

In the above-description, the broadcast programs are used as examples of the contents. However, the invention is also applicable to contents on networks, contents stored in optical media, and so forth.

A program operating in program search devices such as a digital broadcast receiver device according to the present invention may be a program for controlling a CPU (central processing unit) and the like (a program for operating a computer) so as to implement the functions of the above-described embodiments of the present invention. Moreover, information to be handled by these devices is stored temporarily in a RAM (random access memory) at the time of processing, and is then stored in various ROMs such as a flash ROM (read only memory) or in a HDD (hard disk drive). The information is read out, modified, and written by the CPU as appropriate.

Meanwhile, it is also possible to record a program for implementing the functions of the constituents shown in FIG. 1 on a computer-readable recording medium, and to perform the processing of the units by causing a computer system to read and execute the program recorded on this recording medium. The "computer system" cited herein is assumed to include an OS and hardware such as peripheral equipment.

Meanwhile, the "computer-readable recording medium" may be a portable medium such as a flexible disk, a magneto-optical disk, a ROM or a CD-ROM, or a storage device such as a hard disk to be embedded in a computer system. Furthermore, the "computer-readable recording medium" may also include a product which retains the program dynamically for a short period of time such as a communication wire in the case of transmitting the program through a network such as the Internet or through a communication line such as a telephone line, and a volatile memory inside the computer system functioning as a server or a client in that case which is configured to retain the program for a certain period of time. Moreover, the program may be configured to implement part of the above-described functions, or may be configured to implement the above-described functions in conjunction with a program that has already been recorded in the computer system.

Although the embodiments of the present invention have been described in detail with reference to the accompanying drawings, it is to be understood that the concrete configurations of the invention are not limited only to these embodiments and the present invention also encompasses inventions subjected to design changes within a range not departing from the scope of the invention. For example, although the embodiments have described the digital broadcast receiver device as an example of the content notifying device, the invention is similarly applicable to other content notifying devices. The invention is also applicable to a device having a function to display VOD contents.

INDUSTRIAL APPLICABILITY

The present invention is applicable to a content notifying device.

The entire contents of all publications, patents, and patent applications cited in this description are deemed to be directly incorporated by reference.

The invention claimed is:

1. A program search device, including a processing unit and a memory unit, configured to extract a program by using a search condition matching attribute information of the program, comprising:
    a search condition storage unit, included in the memory unit, configured to store the search condition; and
    a display control unit, included in the processing unit, configured to perform control to cause a display unit to perform list display including both a search condition list and a program list, based on a search result, wherein
    the display control unit sets a search condition most recently stored in the search condition storage unit as a highlighted position on the search condition list.

2. The program search device according to claim 1, wherein
    a program extracted based on the search condition in the highlighted position is displayed on the program list.

3. The program search device according to claim 2, wherein
    the search condition is a characteristic category of the program, and
    the characteristic category to be included in the search condition list is selected on a different screen from a screen of the list display and is stored in the search condition storage unit.

4. The program search device according to claim 2, wherein
    the search condition is an inputted keyword, and
    when a keyword is inputted on any of a screen of the list display and a different screen therefrom, a keyword item to be included in the search condition list is selected and stored in the search condition storage unit.

5. The program search device according to claim 1, wherein
    the search condition is a characteristic category of the program, and
    the characteristic category to be included in the search condition list is selected on a different screen from a screen of the search condition list display and is stored in the search condition storage unit.

6. The program search device according to claim 5, comprising:
    a feature search condition list display unit configured to select a characteristic category to be included in the search condition list.

7. The program search device according to claim 6, wherein
    the feature search condition list display unit includes buttons representing the characteristic categories arranged in a matrix fashion and displays the buttons while highlighting the most recent selection and identifiably indicating an earlier selection.

8. The program search device according to claim 7, comprising:
    an individual deletion button configured to delete a target keyword in a selected state for selectively and individually deleting the keywords in the search condition list.

9. The program search device according to claim 7, comprising:
    a full deletion button provided on the screen to display the search condition list of the keywords and configured to fully delete all the keywords in the search condition list.

10. The program search device according to claim 1, wherein
    the search condition is an inputted keyword, and
    when a keyword is inputted on any of a screen of the list display and a different screen therefrom, a keyword item to be included in the search condition list is selected and stored in the search condition storage unit.

11. The program search device according to claim 10, comprising:
    an individual deletion button configured to delete a target keyword in a selected state for selectively and individually deleting the keywords in the search condition list.

12. The program search device according to claim 10, comprising:
    a full deletion button provided on the screen to display the search condition list of the keywords and configured to fully delete all the keywords in the search condition list.

13. A program search device including a processing unit and a memory unit, wherein
    a search condition is a characteristic category of the program selected on a different screen from the screen of a list display and is stored in a search condition storage unit of the memory unit and a search condition list of previously inputted keywords is displayed on one screen so as to enable a change in the search condition in a cross-cutting manner by moving a cursor between the search condition list of characteristic categories and the search condition list of previously inputted keywords.

14. A program searching method for extracting a program by a processing unit using a search condition matching attribute information of the program, comprising:
    a search condition storing step of storing in a memory unit the search condition; and
    a display controlling step of performing control to cause a display unit of a processing unit to perform list display, including both a search condition list and a program list, based on a search result, wherein
    in the display controlling step, a search condition most recently stored in the search condition storing step is set as a highlighted position on the search condition list.

15. The program searching method according to claim 14, wherein
    the search condition is a characteristic category of the program, and
    the method includes a step of selecting a characteristic category to be included in the search condition list, on a different screen from a screen of the list display and storing the selected characteristic category in the search condition storage unit.

16. A computer-readable recording medium storing the program for causing a computer to execute the method according to claim 15.

17. The program searching method according to claim 14, wherein the search condition is an inputted keyword, and the method includes a step of selecting a keyword item to be included in the search condition list when a keyword is inputted on any of a screen of the list display and a different screen therefrom, and storing the selected keyword item in the search condition storage unit.

18. A computer-readable recording medium storing the program for causing a computer to execute the method according to claim 17.

19. A computer-readable recording medium storing the program for causing a computer to execute the method according to claim 14.

* * * * *